(12) United States Patent
Koizumi et al.

(10) Patent No.: US 6,865,048 B2
(45) Date of Patent: Mar. 8, 2005

(54) INFORMATION STORING DEVICE AND METHOD FOR CONTROLLING SAME TO RECORD/REPRODUCE INFORMATION BY SELECTING ONE OF WORKING MODES

(75) Inventors: Yuichi Koizumi, Kanagawa-ken (JP); Hideaki Amano, Odawara (JP); Katsuhiro Tsuneta, Odawara (JP); Koji Kodama, Odawara (JP)

(73) Assignee: Hitachi, Ltd., Tokyo (JP)

( * ) Notice: Subject to any disclaimer, the term of this patent is extended or adjusted under 35 U.S.C. 154(b) by 154 days.

(21) Appl. No.: 10/406,007

(22) Filed: Apr. 3, 2003

(65) Prior Publication Data

US 2003/0218820 A1 Nov. 27, 2003

Related U.S. Application Data

(63) Continuation of application No. 10/230,990, filed on Aug. 30, 2002, now Pat. No. 6,563,658, which is a continuation of application No. 10/106,182, filed on Mar. 27, 2002, now Pat. No. 6,476,994, which is a continuation of application No. 09/694,300, filed on Oct. 24, 2000, now Pat. No. 6,381,087, which is a continuation of application No. 09/408,167, filed on Sep. 29, 1999, now Pat. No. 6,151,182, which is a continuation of application No. 08/931,071, filed on Sep. 15, 1997, now Pat. No. 5,982,570, which is a continuation of application No. 08/469,121, filed on Jun. 6, 1995, now abandoned.

(30) Foreign Application Priority Data

Jun. 7, 1994 (JP) .............................. 6-125375
Sep. 14, 1994 (JP) .............................. 6-219790

(51) Int. Cl.⁷ .............................................. G11B 15/18
(52) U.S. Cl. ............................ 360/69; 360/31; 360/75; 360/73.03; 360/78.06; 369/53.1
(58) Field of Search .............................. 360/69, 31, 75, 360/73.03, 78.04, 78.06, 78.07; 318/62, 66, 440, 779; 369/267, 266, 243, 53.1, 53.37, 53.45

(56) References Cited

U.S. PATENT DOCUMENTS

| 4,675,761 A | 6/1987 | Ashbee et al. |
|---|---|---|
| 4,689,698 A | 8/1987 | Ishikawa et al. |
| 4,816,941 A | 3/1989 | Edel et al. |
| 4,931,889 A | 6/1990 | Osafune |

(List continued on next page.)

FOREIGN PATENT DOCUMENTS

| JP | 59053099 | 3/1984 |
|---|---|---|
| JP | 60045983 | 3/1985 |
| JP | 3-109625 | 5/1991 |
| JP | 3109625 | 5/1991 |
| JP | 4205121 | 7/1992 |
| JP | 5073225 | 3/1993 |
| JP | 5266573 | 10/1993 |
| JP | 5307431 | 11/1993 |
| JP | 5325401 | 12/1993 |

OTHER PUBLICATIONS

Japanese Official Action (in Japanese), dated Jul. 15, 2003.

Primary Examiner—Alan T. Faber
(74) Attorney, Agent, or Firm—Kenyon & Kenyon

(57) ABSTRACT

An information storing device and an information processing device having a memory for registering a plurality of working modes at recording/reproduction and a switching circuit for selecting one of the plurality of working modes, which select the optimum working mode automatically or by an instruction of an operator according to power supply capacity of a device of higher rank to effect recording/reproduction.

9 Claims, 20 Drawing Sheets

U.S. PATENT DOCUMENTS

| | | |
|---|---|---|
| 4,933,785 A | 6/1990 | Morehouse et al. |
| 4,937,689 A | 6/1990 | Seaver et al. |
| 4,991,129 A * | 2/1991 | Swartz |
| 5,062,016 A | 10/1991 | Zupancic |
| 5,151,639 A | 9/1992 | Hasegawa et al. |
| 5,231,549 A | 7/1993 | Morehouse et al. |
| 5,309,296 A | 5/1994 | Nagase et al. |
| 5,406,535 A | 4/1995 | Seo et al. |
| 5,453,972 A | 9/1995 | Kanazawa et al. |
| 5,469,414 A | 11/1995 | Okamura |
| 5,471,353 A | 11/1995 | Codilian et al. |
| 5,493,670 A | 2/1996 | Douglis et al. |
| 5,521,896 A | 5/1996 | Bajorek et al. |
| 5,532,563 A | 7/1996 | Kodama et al. |
| 5,594,595 A | 1/1997 | Zhu |
| 5,652,891 A | 7/1997 | Kitamura et al. |
| 5,668,680 A | 9/1997 | Tremaine |
| 5,696,647 A | 12/1997 | Phan et al. |
| 5,726,825 A | 3/1998 | Phan et al. |
| 5,751,513 A | 5/1998 | Phan et al. |
| 5,760,992 A | 6/1998 | Phan et al. |
| 5,847,895 A | 12/1998 | Romano et al. |
| 5,901,009 A | 5/1999 | Sri-Jayantha et al. |
| 5,973,871 A | 10/1999 | Dunn et al. |

* cited by examiner

FIG. 3

| ACCESS PROPERTY | | AVERAGE ACCESS TIME | AVERAGE ROTATION WAITING TIME (NUMBER OF TURNS) | AVERAGE SEEK TIME | STARTING TIME |
|---|---|---|---|---|---|
| | HIGH PERFORMANCE | → | 3.4ms (8928rpm) | 8ms | 2sec |
| | NORMAL | → | 6.7ms (4464rpm) | 16ms | 3sec |
| WORKING MODES CLASSIFIED BY REQUIRED MAXIMUM CURRENT | 1.5A MODE | 11.4ms | 3.4ms HIGH PERFORMANCE | 8ms HIGH PERFORMANCE | 2sec HIGH PERFORMANCE (0→8928rpm) |
| | 0.9A MODE | 14.7ms | 6.7ms NORMAL | 8ms HIGH PERFORMANCE | 2sec HIGH PERFORMANCE (0→4464rpm) |
| | 0.6A MODE | 22.7ms | 6.7ms NORMAL | 16ms NORMAL | 3sec NORMAL (0→4464rpm) |

FIG. 14

(a): IS SUPPLY POSSIBLE OR NOT?
(b): WORKING MODE OF DISK DEVICE
(c): HIGH SPEED ACCESS MODE
(d): MIDDLE SPEED ACCESS MODE
(e): LOW SPEED ACCESS MODE
(f): SELECTED WORKING MODE NO.

1 ✕
2 ◯
3 ◯

INFORMATION STORING DEVICE AND METHOD FOR CONTROLLING SAME TO RECORD/REPRODUCE INFORMATION BY SELECTING ONE OF WORKING MODES

This is a continuation of application Ser. No. 10/230,990 filed 30 Aug. 2002, now U.S. Pat. No. 6,563,658 which is a continuation of application Ser. No. 10/106,182 filed 27 Mar. 2002, now U.S. Pat. No. 6,476,994 which is a continuation of application Ser. No. 09/694,300 filed 24 Oct. 2000, now U.S. Pat. No. 6,381,087 which is a continuation of application Ser. No. 09/408,167 filed 29 Sep. 1999, now U.S. Pat. No. 6,151,182, which is a continuation of application Ser. No. 08/931,071 filed 15 Sep. 1997, now U.S. Pat. No. 5,982,570 which is a continuation of application Ser. No. 08/469,121 filed 6 Jun. 1995, abandoned.

BACKGROUND OF THE INVENTION

The present invention relates to an information storing device, and in particular to an information storing device having a plurality of working modes at recording/reproduction, which can be selected according to conditions of power supply for a device of higher rank, with which the information storing device is connected, and a method for driving same. The term "information storing device" used here includes a rotary type information storing device such as a magnetic disk device, an optical-disk device, an opto-magnetic disk device, etc. and a magnetic tape device.

The present invention can be applied to a mounted/dismounted type and a fixed type information storing devices.

Down-sizing and diversification have been attempted also for rotary type information storing devices such as a magnetic disk device, optical disk devices, opto-magnetic disk devices, etc. and magnetic tape devices, used as external storing devices, keeping step with down-sizing of electronic computers such as so-called personal computers, office computers, work stations, etc. For example, down-sizing tendency of magnetic disk devices is such that it proceeds from 3.5" to 2.5", to 1.8" and further to 1.3". Down-sizing tendency can be seen also for optical disk devices and opto-magnetic disk devices. Hereinbelow these rotary type information storing devices are generally called simply disk devices.

On the other hand, keeping step with downsizing of the magnetic disk devices, card type mountable/dismountable magnetic disk devices according to PCMCIA (Personal Computer Memory Card International Association) standard have been developed. For example, there are known techniques disclosed in U.S. Pat. No. 5,062,016, filed May 5, 1986, JP-A-5-181565 and further JP-A-4-356785.

As a representative specification, by which standardization is intended, including interface for electric connection, there is a recommended specification on IC memory card for personal computer promoted by Corporate Juridical Person, Japanese Electronic Industry Development Association (JEIDA), in cooperation with PCMCIA in USA. Originally it was a recommended specification exclusively directed to memory card (PCMCIA Rel. 1.0/JEIDA Ver. 4.0). Thereafter it was extended to a specification (PCMCIA Rel. 2.1/JEIDA Ver. 4.2), including magnetic disk devices, keeping step with down-sizing of the magnetic disk devices.

According to this recommended specification on IC memory card for personal computer, working conditions can be set so that a relevant memory card can be used together with other cards of an electronic computer system. According to the specification the system can be so constructed that it is prohibited to use a PC card, when working conditions offered by the PC card don't satisfy working conditions required by the system.

A parameter on power condition information is included in these working conditions. The parameter includes standard voltage of working power, minimum voltage of working power, maximum voltage of working power, current of continuous power, maximum value of mean current in 1 sec, maximum value of mean current in 10 millisec, necessary supplied current in power down mode, etc.

The system, in which use of a PC card type magnetic disk device is expected, is diversified.

That is, it extends from a work station having a sufficient power-supply capacity, which demands a high speed access property from the magnetic disk device, to a portable type computer incorporating a battery, which demands low power consumption rather than access property. Therefore it is desired for the PC card type magnetic disk device used over these not specified but diversified devices of higher rank to be able to offer selectively a high speed access property or a low power consumption according to power supply capacity of a device of higher rank connected therewith.

However, as it can be seen from the recommended specification for IC memory card for personal computer published by JEIDA and PCMCIA in USA, there are no disk devices including a PC card type or a fixed type which can offer selectively a high speed access property or a low power consumption according to power supply capacity of the device of higher rank.

Personal computers of notebook size or pocket notebook size have been used more and more often outside office owing to down-sizing of computers, which has accelerated lowering of power consumption of disk devices mounted on the computers. That is, it has been tried to lower power consumption according to the tendency that smaller driving power of a disk device is more desirable. As an example thereof, there are known techniques disclosed in U.S. Pat. No. 4,933,785 (corresponding Japanese application JP-B-3-503101), in which electric power supply to circuits, for which no power is required functionally in each working mode, is suppressed by constructing a magnetic disk device so that either one of working modes can be set by classifying them into:

1) sleep mode, in which, least necessary interface function with a device of higher rank (computer system) necessary for restarting CPU being left, other circuits or function thereof are stopped;

2) idle mode, in which CPU is working and, all interface functions with the device of higher rank being left, function of a spindle motor, a servo motor, a record reproducing circuit, etc. is stopped;

3) idle mode, in which servo function is working in a state where the spindle motor is rotated and a data recording/reproducing circuit is in a stopped state; and 4) several working modes in usual operation such as a write/read mode, a seek mode, etc.

An effect to reduce mean power consumption in the different working modes can be achieved by this method. However, by this method, no attention is paid to the initial period of the spindle motor start, at which power consumption is maximum. For this reason, no effect can be obtained to reduce specifically power current at start of the disk device.

As other prior art techniques there are those disclosed in JP-A-4-205963.

By this method, the number of turns of the spindle motor is decreased to such a degree that the rotation of the disk is maintained in a waiting mode, in which write/read is not effected. This method has an effect to reduce the transient necessary maximum power current to shorten a period of time necessary for increasing the rotation of the disk to a predetermined value.

However, in a disk device in general, frequency with which the state where write/read is not effected is produced is not necessarily so high. Further, since the state where write/read is not effected is one where power consumption is smallest next to the not working state (power consumption being 0 W) where power is not switched on (power consumption is greatest at start of the motor and next greatest at file access, in either case power consumption being greater than that required when read/write is not effected while rotating the motor), as indicated in a cited reference, even if the disk motor speed is reduced by setting a waiting mode in this state where read/write is not effected, no effect to reduce remarkably power consumption can be obtained as a whole. On the contrary, considerable power is consumed temporarily, because it is required to increase the rotation speed of the disk motor up to a predetermined value, when it proceeds from this waiting mode to a write/read operation, if the read/write state is interrupted in this waiting mode.

Furthermore, since a certain period of time is required for increasing the rotation speed of the motor up to the predetermined value when it proceeds from this waiting mode to the write/read operation, this gives rise to a problem that start of the write/read operation is retarded, which lowers working speed.

In addition, in this cited reference, read/write speed is only one usual speed (one kind) and no attention is paid to setting arbitrarily diversified data read/write speeds according to needs of users.

As another prior art example, there are known techniques, by which in case where the point of time of a succeeding read/write start is previously known in a magnetic disk device, it is avoided to accelerate/decelerate the head more strongly than required to save power at seek by detecting a waiting time from seek start to read/write start and by controlling seek speed (moving speed) of the head so that the difference between this waiting time and an average seek time previously obtained for each displacement distance of the head be approximately zero, as described in JP-A-63-87663.

However no idea is disclosed to distinguish high speed seek, by which high speed processing is possible, and low speed seek effected with low noise and low power according to request of the user or according to power supply capacity of the device of higher rank. Further no attention is paid to read/write arbitrary data with different read/write speeds such as a high speed, a standard speed and a low speed according to request of the user.

As a prior art example on the high speed access property, there are known techniques, by which in order to improve operability of a reproducing device in a compact disk (CD) or a digital audio tape recorder (DAT), a second speed it automatically set for read/write of signals such as control signals TOC other than audio signals, which speed is higher than read/write speed for usual audio signals, as described e.g. in JP-A-2-156470. However, in this document, no attention is paid to record/write arbitrary data which should be used by the user with different medium speeds such as a high speed, a standard speed and a low speed or to lower power consumption according to request of the user or according to power supply capacity of the device of higher rank.

For a magnetic head used in a magnetic disk device, heretofore an inductive head is used, which produces reading voltage on the basis of the electro-magnetic induction effect on winding conductor.

Recently an MR head is used, which produces reading voltage on the basis of the magneto-resistance effect. The MR head has a feature that it produces reading voltage without variations in magnetic field intensity due to relative movement of the magnetic head to a magnetic recording face. Further for the magnetic head of hard disk drive, a floating method is usually used, utilizing a hydromechanical effect acting between the head slider and the disk surface. In addition, recently a contact method called contact recording is used, by which the head slider, on which the magnetic head is mounted, is not floated.

Requirements of users for properties of a magnetic disk device or an optical disk device can be roughly classified into two types, as described below.

① high speed transfer, high speed access, and
② low power consumption, low noise.

In order to satisfy the requirements defined by ①, it is necessary to increase the read/write speed of the disk, i.e. the rotation speed and the seek speed of the head. On the contrary, in order to satisfy the requirements defined by ②, it is necessary to decrease the read/write speed of the disk (rotation speed) and the seek speed of the head. These two properties are contradictory to each other and there exists heretofore no disk device satisfying these two properties at the same time, but there are different models of devices, each of which has one kind of the data read/write speed and the seek speed. For this reason every user cannot help preparing at least one model of devices satisfying each of the two properties and selecting a magnetic disk device having properties suitable for utilization conditions (whether it is used under restriction on noise level and maximum power, whether the transfer-access speed is regarded as important, etc.) for every use.

In this case problems as described below take place:

① a magnetic disk device having either one of the properties should be selected, even if aimed utilization conditions are not clear;
② there is no way other than buying another or replacement by another, when it is desired to exchange a property of a magnetic disk device with another in the course of utilization because of change in utilization conditions; and
③ it is impossible tio switch over the properties timely according to utilization.

Particularly such problems take place for a disk device attached to a personal computer using both a commercial AC power source and an incorporated battery power source such as e.g. a notebook type personal computer. In this kind of personal computers, since sufficient power can be supplied in case where a commercial AC power source is used, it is desirable to keep the head seek speed and the disk read/write speed satisfactorily high. On the other hand, in the case where an incorporated battery power source is used, it is desirable to lower the head seek speed and the disk read/write speed to use it at a low power consumption in order to elongate continuous utilization time of the system.

However there exist no information storing devices yet, which can be used while switching working modes of access or read/write according to utilization conditions.

SUMMARY OF THE INVENTION

An object of the present invention is to provide an information storing device having a function to effect a high speed processing of the information storing device while making positively efficient use of power, when enough power is disposable and to drive the information storing device at various low power consumption modes, when disposable power is not enough, according to power conditions of the device of higher rank, with which the information storing device is connected.

Concretely speaking, it is to provide an information storing device which selects itself or has a device of higher rank select a high speed access property, a high speed processing property or a low power consumption property according to power supply capacity thereof for wide ranging devices of higher rank 1) from work stations having sufficient power supply capacities, demanding a high speed access property and a high speed processing property to the disk device 2) to battery incorporating portable type electronic computers demanding low power consumption rather than access property, etc, and performs read/write operations with the selected operation or working mode.

Another object of the present invention is to provide a disk device capable of removing the problems of the prior art techniques, by which a user can select arbitrarily one of at least two modes, which are a quick mode (high speed transfer·high speed access mode) for effecting seek and data read/write and a silent mode (low speed·low power consumption·low noise mode).

Still another object of the present invention is to provide a disk device having a switching function acting so as to select the quick mode in case where a commercial power source is used and the silent mode in case where an incorporated battery power source is used in a disk device attached to a personal computer, in which both the commercial power source and the incorporated battery power source is used.

In order to achieve the above objects an information storing device according to the present invention is constructed as follows.

The information storing device provided with means for inputting power from a device of higher rank; a device for selecting one of working modes having different necessary maximum currents; and a device for informing the device of higher device of necessary maximum current information on each of the selectable working modes.

Particularly in a device using a disk-shaped memory medium the selectable working modes are composed of combinations of:

1) different disk rotation speeds;

2) different average seek times; and 3) different times for starting the spindle motor.

In case where a magnetic tape is used, various working modes are realized by making speeds of fast forwarding and rewinding different.

Further a read head for reading out signals from data recorded in a disk may be an MR head using a magneto-resistance effect element. In addition, the contact recording method may be used, by which the magnetic head is not floated by the hydromechanical effect between the slider, on which the read head is mounted, and the surface of the magnetic disk in a region of the rotation speed of the magnetic disk in the selectable working modes.

The information storing device may comprise further a device for receiving information on current, which the device of higher rank can supply, from the device of higher rank, with which it is connected, and a device for prohibiting execution of the working modes, in which the necessary maximum current is greater than the current, which can be supplied, among the plurality of working modes.

On the other hand the device of higher rank includes-a device for supplying electric power to the information storing device; a device for receiving the maximum current information of the plurality of selectable working modes having different necessary maximum currents; a device for detecting or calculating current, which the device feeding with electric power can supply, taking utilization situations into account; a device for selecting a specified working mode among the plurality of working modes; and a device for prohibiting that the working modes, in which the necessary maximum current is greater than the current, which can be supplied, are selected among the plurality of working modes.

An important effect can be obtained particularly in case where a power source (battery) is incorporated in the device of higher rank.

When a working mode, in which the necessary maximum current of the information storing device is greater than the current which can be supplied by the device feeding with electric power in the device of higher rank, is selected, either one or a plurality of following predetermined operations are effected, before electric power is supplied in reality e.g. for starting the spindle motor in the connected information storing device:

1) it is prohibited to select the specified working modes;

2) it is displayed to an operator that the specified working modes are included; and 3) a selectable working mode is executed.

By a method for controlling the device of higher rank and the information storing device, the device of higher rank is informed by the information storing device of the necessary maximum current information on each of the plurality of selectable working modes before the start of the, spindle motor, which is an operation giving the greatest current, thereafter the information storing device receives a control signal for selecting one of the plurality of working modes from the device of higher rank, and the start and normal rotation of the spindle motor or operation for positioning the read head is effected according to the working mode thus selected.

By another control method, when the information storing device receives the command to start the spindle motor from the device of higher rank, while the information storing device informs the device of higher rank of the necessary maximum current information several times in a predetermined order, it stops to inform the device of higher rank of the necessary maximum current information and at last begins the start of the spindle motor in the working mode, for which the device of higher rank is informed of the necessary maximum current information.

Particularly, in an information storing device using a magnetic tape, the operation for selecting the working mode is effected before the start of the tape forwarding.

Further, in order to achieve the above objects, a disk device according to the present invention is constructed as follows.

(1) A disk device, in which a disk-shaped recording medium is rotated and at the same time a head is moved towards an aimed position on the recording medium to record data in the recording medium or to reproduce the data therefrom, comprises a head moving speed mode switching device, which switches the seek moving speed of the head by more than two steps, and a medium rotation speed mode switching device, which switches the rotation speed at recording or reproduction of the recording medium by more than two steps.

(2) A disk device according to (1) is so constructed that switching of the seek moving speed of the head and switching of the rotation speed of the recording medium are effected according to a command from the device of higher rank.

(3) A disk device according to (1) or (2) is so constructed that it has both a commercial power source and an incorporated battery power source and that the device for switching the head moving speed mode and the device for switching medium rotation speed mode switch both the seek moving speed of the head and the rotation speed of the recording medium to high speed mode, when the commercial power source is used, and both the seek moving speed of the head and the rotation speed of the recording medium to low speed mode, when the incorporated battery power source is used.

Operation based on the construction will be explained below.

According to the construction described in (1), since the seek moving speed of the head and the rotation speed of the recording medium (disk) can be switched by more than two steps, when a user wishes to effect read/write of signals at a high speed with one disk device, he can read/write in a state where the quick mode (both the head and the disk at the highest speeds) is selected, and on the contrary, when he wishes to reduce noise and power consumption, he can read/write in a state where the silent mode (both the head and the disk at the lowest speeds) is selected. Since the working mode can be selected arbitrarily, as described above, ① even if utilization conditions are not previously determined, it is possible to select a working mode suitable to utilization conditions determined thereafter; ② even if utilization conditions are changed, it is unnecessary to purchase any new disk device; and further ③ even in the course of utilization the user can change the working mode in accordance with utilization conditions.

If a speed mode switching mechanism is so constructed that mode switching is effected by a command from the device of higher rank to a microprocessor in the disk device according to the construction described in (2) so that the user can select a suitable mode freely at any time, the user can select a desired mode simply by key operation, etc. Further, instead thereof, the switching of the mode can be effected also by means of a switch of hardware such as a jumper connector disposed on a head driving circuit and a disk motor driving circuit in the disk device.

According to the construction described in (3), in case where a commercial power source is used for power supply of a personal computer and a disk device, the quick mode of high speed read/write and high speed seek is selected so that data transfer/access of high speed and high performance can be effected. On the contrary, in case where an Incorporated battery power source is used, the silent mode of low-speed read/write and low speed seek is selected so that data transfer/access continuously operable for a long time can be effected with a low noise and a low power consumption.

Following advantages can be obtained by the information storing device according to the present invention.

Higher access property, higher starting property and higher tape forwarding property can be achieved according to capacity of the power source.

Further, by using an MR head, since influences of variations in the rotation speed of the magnetic disk on the read signal are kept small, effects of the different working modes having different rotation speeds of the magnetic disk can be more efficient.

Furthermore, by using a non-floating magnetic head, since influences of variations in floating amount on the read signal are kept small, effects of the different working modes having different rotation speeds of the magnetic disk can be more efficient.

Since the operator can select arbitrarily one of the selectable working modes to execute and also since the device of higher device can select suitably one working mode to execute, an effect can be obtained of efficient utilization of the incorporated power source.

An effect can be obtained such that it is possible to effect driving and control of the information storing device suitable for power supply capacity of the device of higher rank. Consequently, in case where the incorporated power source is a battery, an effect can be obtained such that it is possible to lenghten utilization time of the battery.

According to the present invention it is possible to use widely not only a magnetic disk device compatible with the PC card standard but also other information storing devices. That is, it is possible to provide an information storing device, a device of higher rank thereof and a method for controlling same, which can offer a high speed access property or a low power consumption property according to power supply capacity of wide ranging devices of higher rank from work stations having sufficient power supply capacity and requesting high speed access property from the information storing device to battery incorporating portable computer devices requesting low power consumption rather than access property.

Further, according to the present invention, since one disk device is so constructed that the seek speed of the head and the rotation speed of the disk recording medium can be switched by more than two steps, an effect can be obtained that the working mode can be selected arbitrarily according to request of a user, e.g. the silent mode of low speed is selected, when file access and data transfer of low noise and low power consumption are desired, while the quick mode is selected, when high speed file access and data transfer are desired. Further, since no prior art waiting mode (waiting mode, in which the rotation speed of the disk motor between different accesses to read/write is lower than the rotation speed at read/write) is adopted, an effect can be obtained that no operation for increasing (raising) the rotation speed of the motor up to a predetermined value at successive data accesses is necessary and therefore no delay in the read/write operation due to this operation for increasing the rotation speed of the motor up to the predetermined value is produced.

Further an effect can be obtained that a user can select easily a required mode, if selection and switching of these working modes are effected by the device of higher rank.

Furthermore, in case where the present invention is applied to a personal computer, in which both a commercial power source and an incorporated battery power supply are used, such as a notebook type personal computer, an effect can be obtained that it can be used properly according to utilization conditions, because when the commercial power source is used, since the quick mode of high speed read/write and high speed seek is selected, it is possible to effect data transfer and access of high speed and high performance, and on the contrary, when the battery power source is used, since the silent mode of low speed read/write and low speed seek is selected, a long time continuous operation can be effected with low noise and low power consumption, etc.

BRIEF DESCRIPTION OF THE DRAWINGS

FIG. 3 is a diagram indicating specification of different working modes of the disk device according to the present invention;

FIG. 14 is an example of display indicating relation between current which can be supplied and the working mode;

DETAILED DESCRIPTION

Hereinbelow an embodiment of the present invention will be explained, referring to several diagrams and tables.

Figure 1:
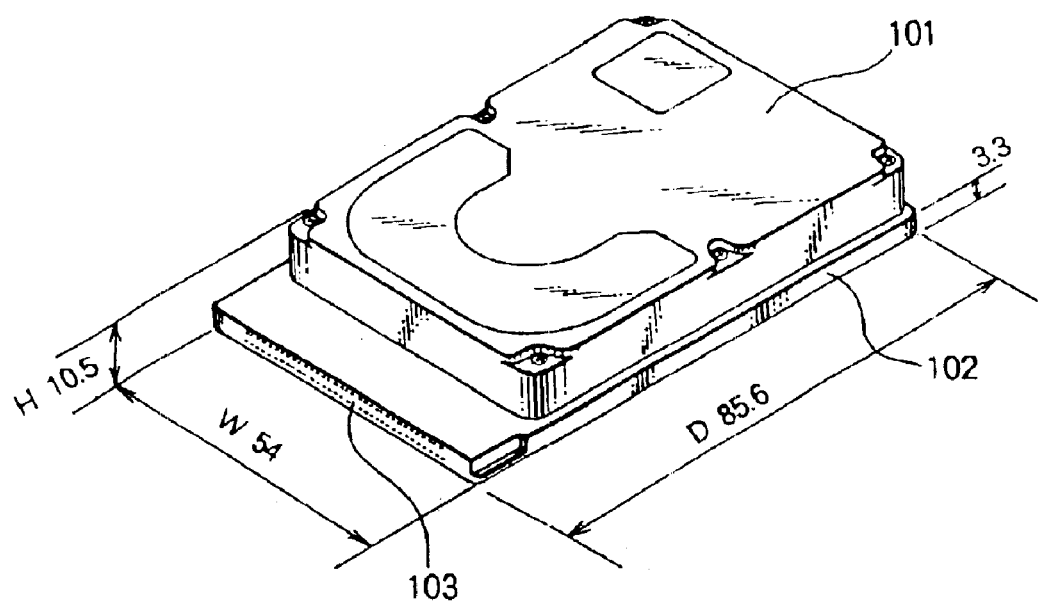
FIG. 1 is a perspective view of a disk device according to the present invention.

FIG. 1 is a perspective view of a disk device which is an embodiment of the present invention. Explanation will be made taking a mountable/dismountable magnetic disk device as an example of the disk device. Of course, the present invention can be applied to a fixed type disk device. Outer sizes of the whole disk device 101 are: width W=54 mm, depth, D=85.6 mm and height H=10.5 mm. Outer sizes of a card-shaped portion 102 are: width W=54 mm, depth D=85.6 mm and height B=3.3 mm. A connector portion 103 is composed of 68 pins, including power lines and data command lines. These are consistent with Type 3 of the IC memory card specification for personal computer standardized according to PCMCIA/JEIDA.

Figure 2:
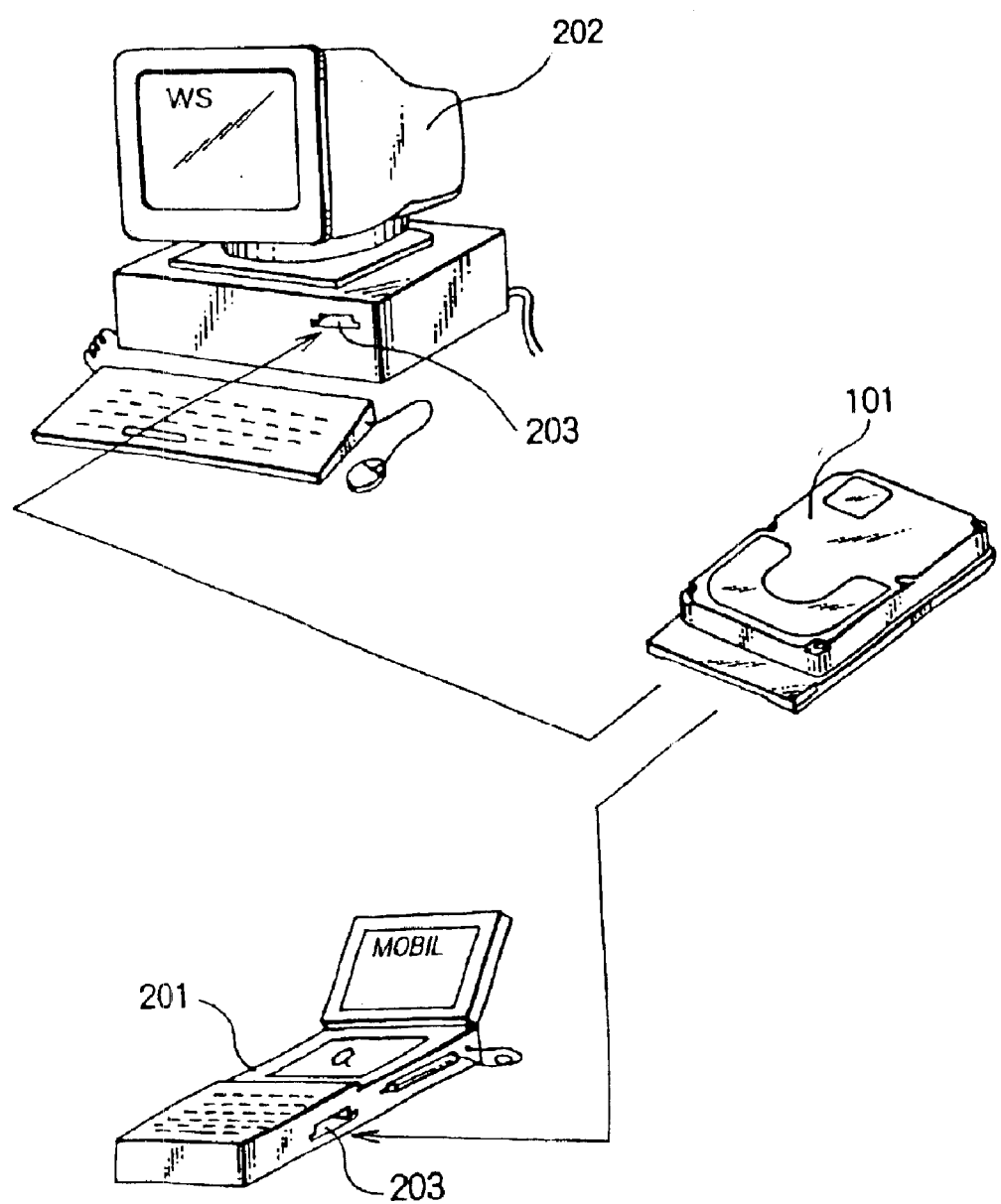
FIG. 2 is a perspective view of the disk device according to the present invention, a battery incorporating information processing device and a work station computer device, in each of which the disk device is used.

FIG. 2 shows a mode of utilization of the disk device 101.

There is disposed a slot 203 for inserting an IC memory card in each of a power source incorporating information processing device 201 and a work station computer device 202.

The power source incorporating information processing device 201 is a portable low power consumption type computer device, which is provided with the slot 203 for inserting an IC memory card of Type 3, a foldaway display plate, a hand writing input plate, a hand writing input pen, and input keys. The work station computer device 202 is a desk high performance computer device, which is also provided with a slot 203 or inserting an IC memory card of Type 3. The disk device 101 is mountable/dismountable on/from a device of higher rank provided with a slot 203 for inserting an IC memory card such as a power source incorporating information processing device 201, a work station computer device 202, etc.

FIG. 3 shows working modes of the disk device, which is an embodiment of the present invention.

Average access time and starting time can be cited as access property of the disk device. The average access time is a sum of average rotation waiting time and average seek time.

In the working mode of a prior art magnetic disk device there was only one kind of 0.6 A mode. In this working mode the starting time took 3 sec, including the rotation starting time necessary for the rotation speed to reach 4464 rpm. The average rotation waiting time was 6.7 msec, which is a time corresponding to ½ turn at a disk rotation speed of 4464 rpm. The average seek time was 16 msec and the average access time was 22.7 msec.

There are three kinds of working modes classified by the required maximum current, including a complete set of spindle motor starting operation, read operation and head track seek operation, which are 0.6 A mode, 0.9 A mode and 1.5 A mode. The access property in the 0.6 A mode is identical to that obtained in the working mode of the prior art disk device.

In the 0.9 A mode, the starting time and the average seek time are improved. The starting time is 2 sec, including the rotation starting time necessary for the rotation speed to reach 4464 rpm. The average rotation waiting time is 6.7 msec, which is a time corresponding to ½ turn at a disk rotation speed of 4464 rpm, the average seek time is 8 msec and the average access time is 14.7 msec.

Figure 4:
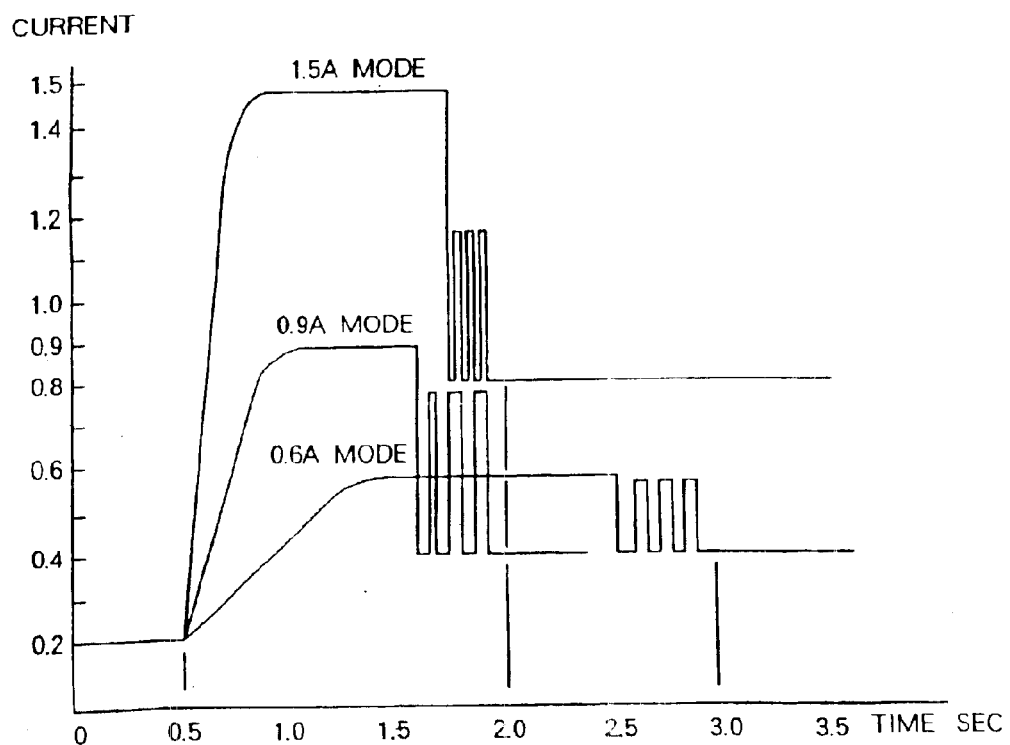
FIG. 4 is a diagram indicating current waveforms at starting different working modes.

In the 1.5 A mode, in addition, the average rotation waiting time is improved. The starting time is 2 sec, including the, rotation starting time necessary for the rotation speed to reach 8928 rpm. The average rotation waiting time is 3.4 msec, which is a time corresponding to ½ turn at a disk rotation speed of 8928 rpm, the average seek time is 8 msec and the average access time is 11.4 msec. FIG. 4 shows variations in the starting current of the disk device, which is an embodiment of the present invention corresponding thereto.

FIG. 4 shows that maximum current is required at a initial period of drive of the spindle motor, depending on the starting mode. When the speed is increased in the seek operation, required current is also increased and increase of electric power required for initial drive of the spindle motor is greater.

Figure 5:
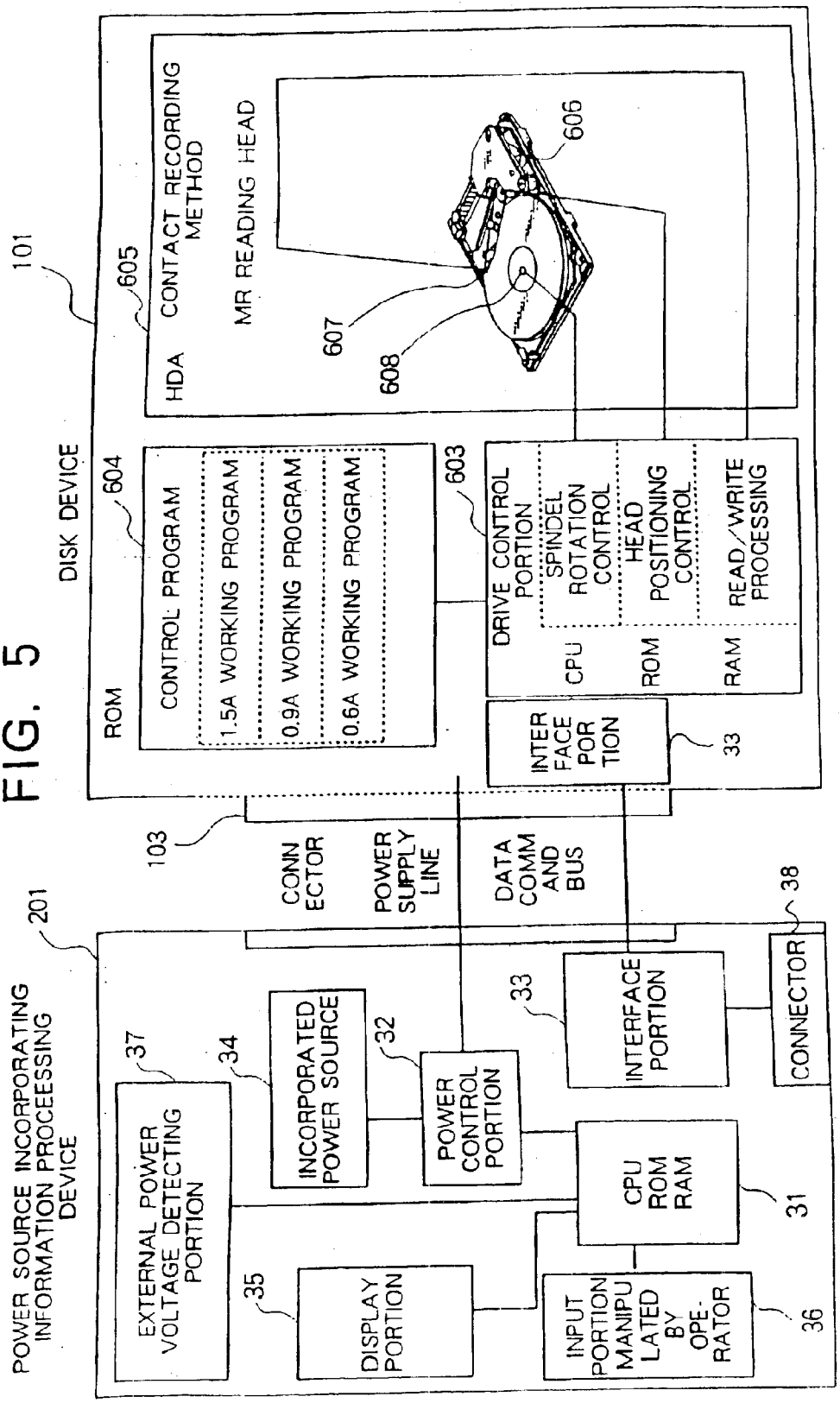
FIG. 5 is a block diagram indicating a connection relation between the disk device and the battery incorporating information processing device.

FIG. 5 shows a block diagram of the power source incorporating information processing device 201 and the disk device 101, which are an embodiment of the present invention. Even if no power source is incorporated in the information processing device 201, the present invention can be applied thereto.

The disk device 101 is connected with the power source incorporating information processing device 201 through a connector portion 103 by means of power supply lines and data/command buses.

A drive control portion 603 in the disk device 101 includes CPU, RAM, ROM, etc. and effects rotation control of a spindle motor 608, head positioning control through control of a voice coil motor 606, read/write control through a read/write head 607, etc. on the basis of a control program in the ROM 604. The control program in the ROM 604 includes three kinds of drive control programs, in which the required maximum currents are 0.6 A, 0.9 A and 1.5 A, respectively, corresponding to the working mode of the disk device, which is an embodiment of the present invention indicated in FIG. 3.

The read/write head 607 included in HDA (head disk assembly) 605 of the disk device 101 may be used also by the contact recording method. Further an MR reading head 606 using a magneto-resistive element may be used therefor.

The power source incorporating information processing device 201 has CPU, ROM and RAM in a control portion 31, determines how much current a power control portion 32 can supply to the disk device 101 and informs the disk device 101 of results thus obtained through an interface portion 33 and a connector 38. 34 is an incorporated power source; 35 is a display portion; and 36 is an input portion manipulated by an operator. 37 is an external power voltage detecting portion connected with control portion 31. When the external power is not supplied, the power system is switched to incorporated power source 34 by control portion 31.

Figure 6:
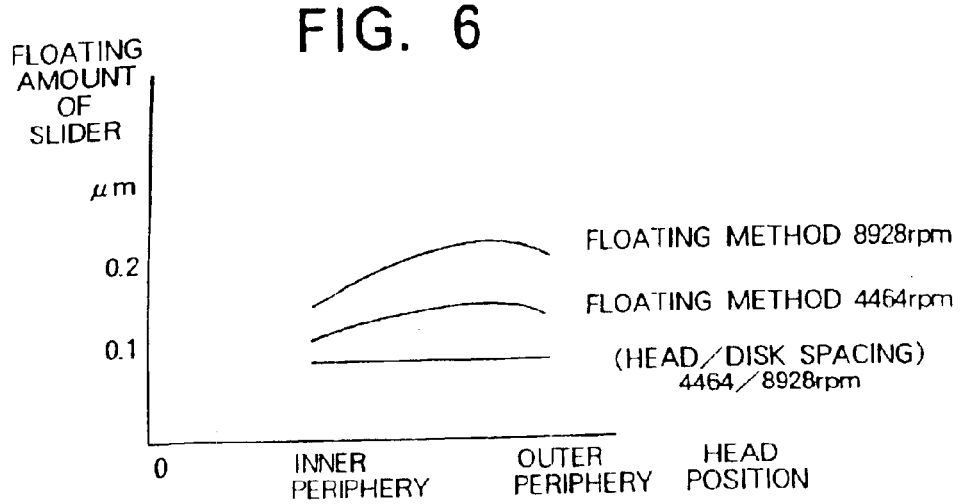
FIG. 6 is a diagram indicating a relation between position and floating amount of a magnetic head.

As indicated by a graph representing variations in floating amount of the magnetic head (including both an inductive magnetic head and an MR magnetic head) in FIG. 6, when the head floating method is used, it is difficult to avoid variations in floating amount due to difference in the disk rotation speed and difference in the inner and outer peripheral linear speed of the head. On the contrary, by the contact recording method no variations in floating amount are produced. For this reason it is not necessary to compensate variations in spacing loss, variations in effective gap loss and variations in amplitude-frequency characteristics due thereto in the magnetic-electric transforming reproduction process, which are produced by the floating method. Therefore the contact recording method is suitable for the disk device, which is an embodiment of the present invention working with a plurality of rotation speeds.

Figure 7:
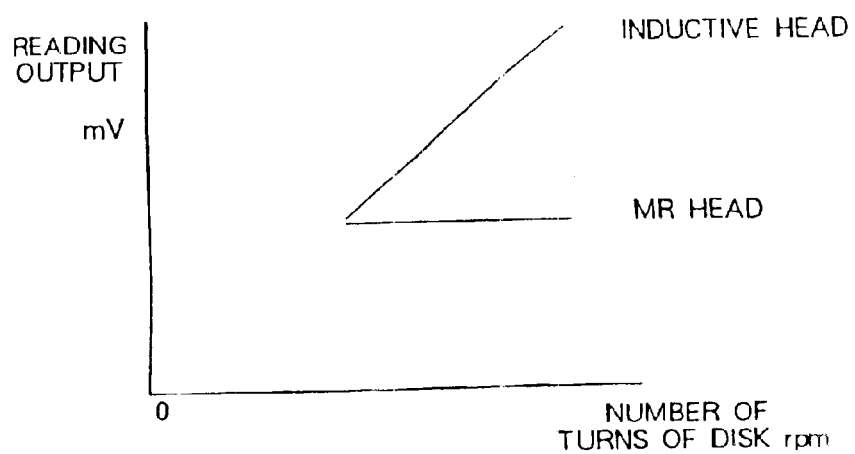
FIG. 7 is a diagram indicating reading outputs for different types of magnetic heads.

FIG. 7 shows reading output of the magnetic heads.

As indicated thereby, when the inductive magnetic head is used, it is difficult to avoid variations in amplitude-frequency characteristics, i.e. variations in the reading output, in the magnetic-electric transforming reproduction process due to differences in rotation speeds of the magnetic head and the magnetic disk. On the contrary, since variations in the reading output are small for an MR reading head, no compensating circuit therefor is necessary. The MR reading head is suitable for the magnetic disk device, which is an embodiment of the present invention working with a plurality of rotation speeds.

Figure 8:
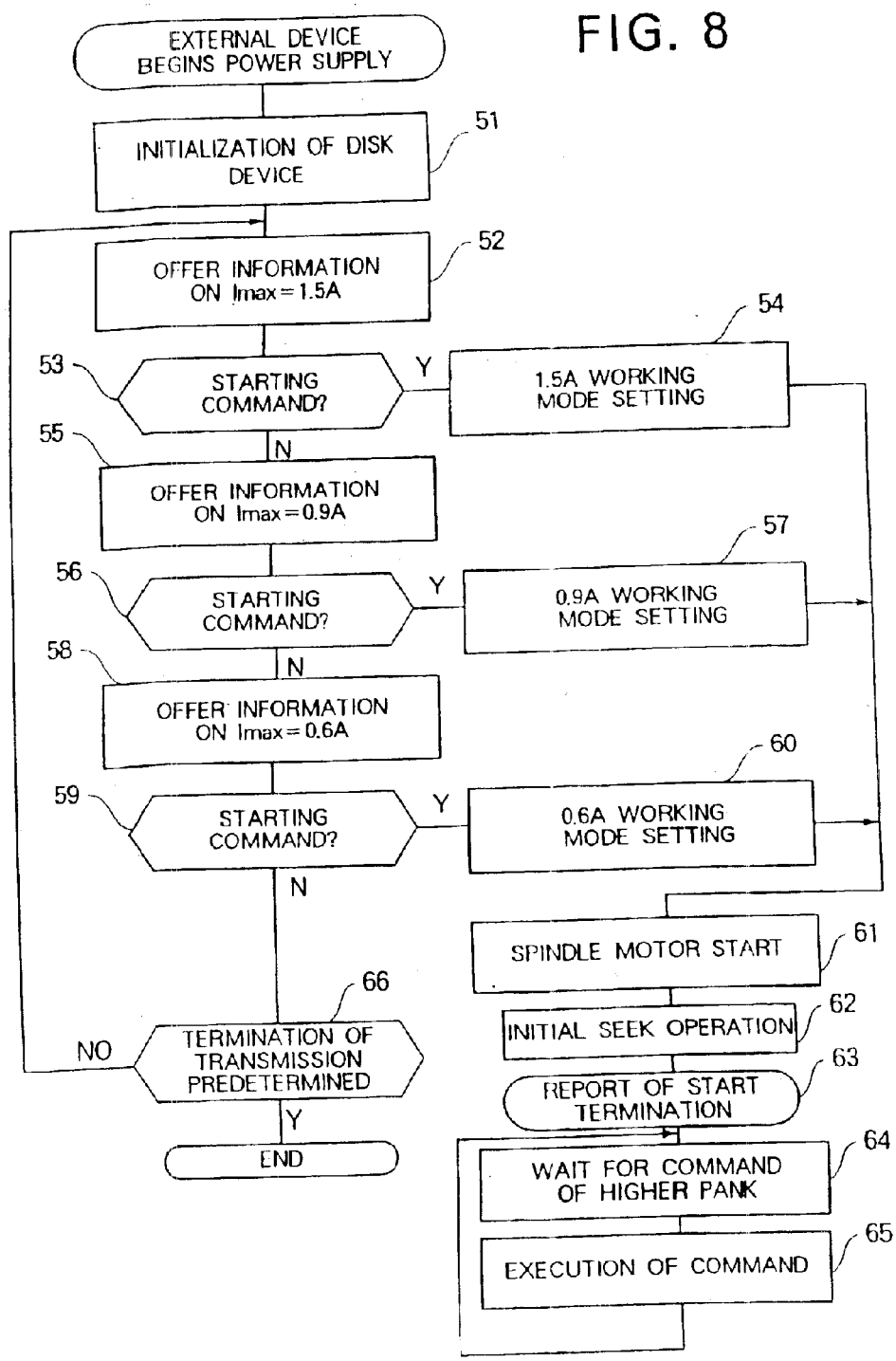
FIG. 8 is a flow chart showing an embodiment of starting procedure on the disk device side according to the present invention.

FIG. 8 is a flow chart showing a procedure for starting the disk device, which is an embodiment of the present invention.

In the disk device initialization is effected (Step 51) after start of power supply from the battery incorporating information processing device, which is the device of higher rank thereof. Thereafter it transmits the information on maximum currents Imax required in the different working modes to the device of higher rank in a predetermined order. In the present embodiment it is transmitted in an order of 1.5 A, 0.9 A and 0.6 A, i.e. with decreasing maximum current. Therefore information of 1.5 A is offered at first (Step 52). Then it waits for a start command from the device of higher rank allowing an operation in the 1.5 A working mode for a predetermined time (Step 53). When the start command has been received, the 1.5 A working mode is set (Step 54) to start the spindle motor (Step 61) and to effect an initial seek operation (Step 62). When the start has been terminated, this is reported (Step 63) and it waits for read/write and other commands of higher rank (Step 64). One of the other commands of higher rank is e.g. a command of changing the working mode. When this command has been received, the procedure returns to Step 51 to set a new working mode. If it receives a command of read/write, it executes that command (Step 65) and the procedure returns to Step 64 to wait for a succeeding command.

If no start command in the 1.5 A working mode has been received when a predetermined period of time has lapsed, 0.9 A information is offered to the device of higher rank (Step 55). Then it waits for a start command from the device of higher rank allowing an operation in the 0.9 A working mode for a predetermined time (Step 56). When the start command has been received, the 0.9 A working mode is set (Step 57) to effect a series of the operations defined in Steps 61 to 65. If no start command in the 0.9 A working mode has been received when a predetermined period of time has lapsed, 0.6 A information is offered to the device of higher rank (Step 58). Then it waits for a start command from the device of higher rank allowing an operation in the 0.6 A working mode for a predetermined time (Step 59). When the start command has been received, the 0.6 A working mode is set (Step 60) to effect a series of the operations defined in Steps 61 to 65.

If no start command in the 0.6 A working mode has been received when a predetermined period of time has lapsed, it is checked whether the maximum current information has been transmitted to the device of higher rank repeatedly a predetermined number of times or not (Step 66). In case where it has been not transmitted thereto repeatedly a predetermined number of times, the procedure returns to Step 52 to repeat a series of transmission operations. On the contrary, if it has been transmitted thereto repeatedly a predetermined number of times, the procedure is terminated.

In the embodiment indicated in FIG. 8, once a working mode is set, the operation is continued in the same working mode, until either the power supply is switched off or a command of changing the working mode is received.

Figure 9:
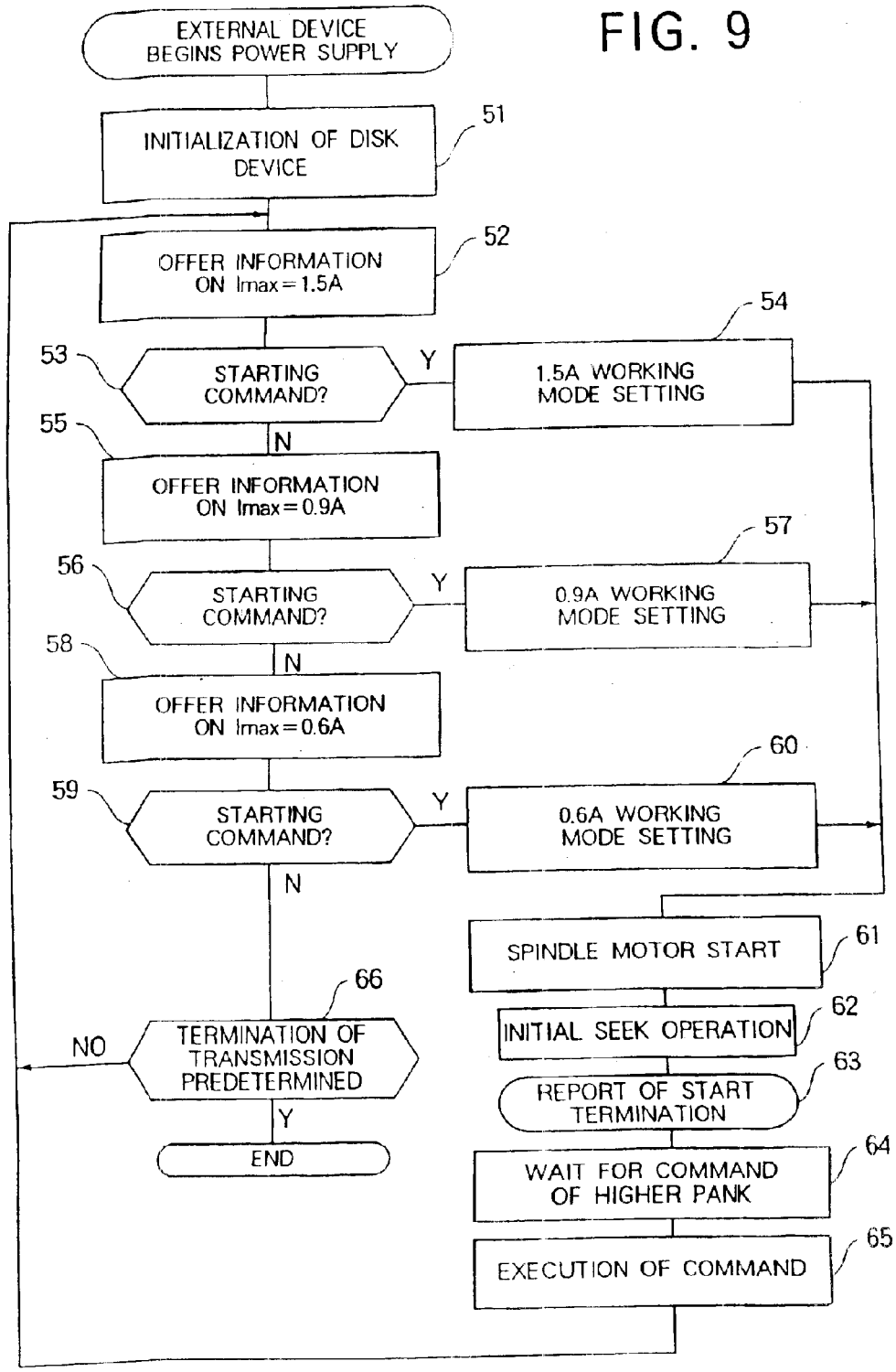
FIG. 9 is a flow chart showing another embodiment of starting procedure on the disk device side according to the present invention.

FIG. 9 shows another embodiment, in which power supply capacity of the device of higher rank is used most efficiently. Power supply conditions of the device of higher rank are not always constant. In case where the device of higher rank drives a number of peripheral devices connected therewith, the power supply capacity thereof to the disk device is small. On the contrary, in case where it drives few peripheral devices, the power supply capacity thereof to the disk device is great. Consequently, in the embodiment indicated in FIG. 9, the disk device inquires at every opportunity of the device of higher rank about the power supply conditions thereof and works in a low performance working mode, in which power consumption is small, when the power supply capacity of the device of higher rank is small, while it works in the high performance working mode, changing the working mode, when the power supply capacity of the device of higher rank is great.

Differences from the procedure indicated in FIG. 8 are that the procedure returns to Step 52 after execution of the command in Step 65 and that operation is effected in a working mode with a speed as high as possible, every time a command of higher rank is issued.

Figure 10:
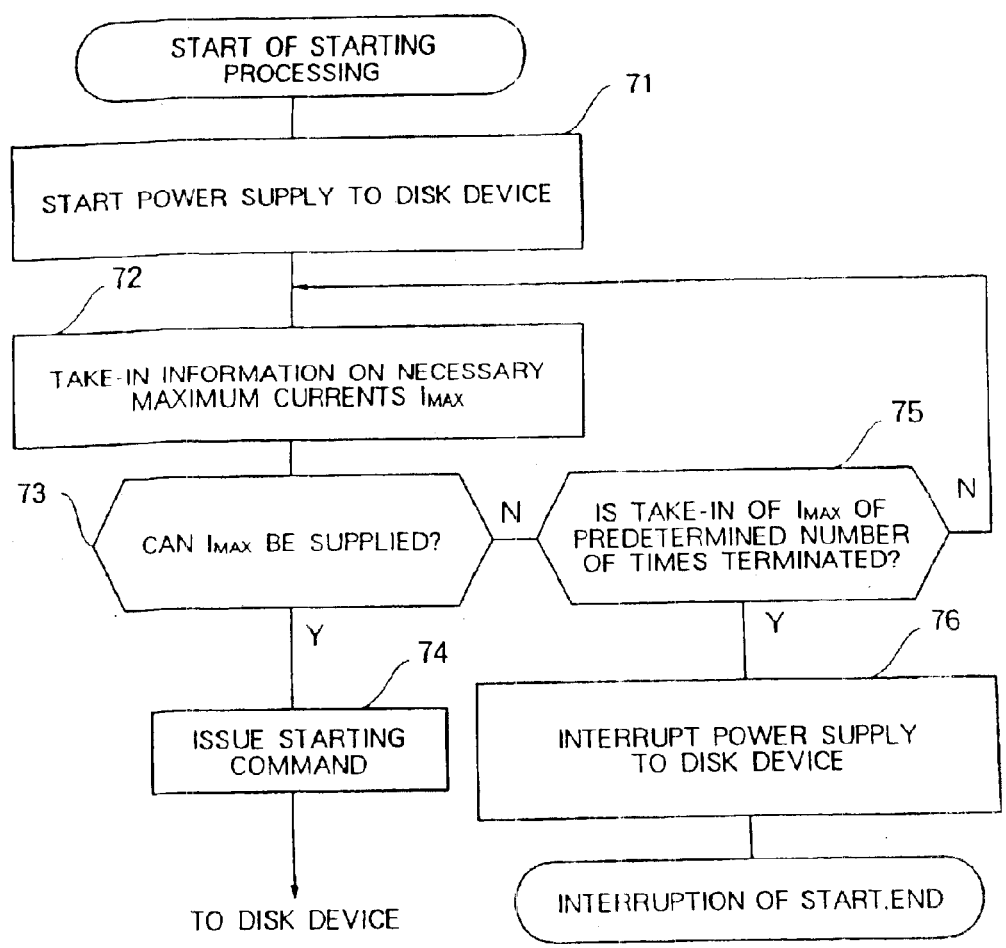
FIG. 10 is a flow chart showing an embodiment of starting procedure of the disk device on the device of higher rank side according to the present invention.

FIG. 10 shows a processing flow of the power source incorporating information processing device acting as a device of higher rank, corresponding to the operations of the disk device indicated in FIGS. 8 and 9.

When power source is switched on, power supply to the disk device is started (Step 71). The maximum current information from the disk device is taken-in (Step 72) and it is checked whether the current Imax thus taken-in can be supplied or not (Step 73). If it can be supplied, a start command is issued (Step 74). If it cannot be supplied, the procedure proceeds to Step 75 and it is checked whether information of a series of currents is taken-in a predetermined number of times or not. In case where it is not taken-in a predetermined number of times, the procedure returns to Step 72 and current information transmitted succeedingly thereto is taken-in. If it is verified in Step 75 that it has been taken-in the predetermined number of times, power supply to the disk device is interrupted (Step 76) and the start of the disk device is stopped. In case where the start is stopped, it may be displayed in Step 76 that the connected disk device cannot be driven by this device of higher rank.

Figure 11:
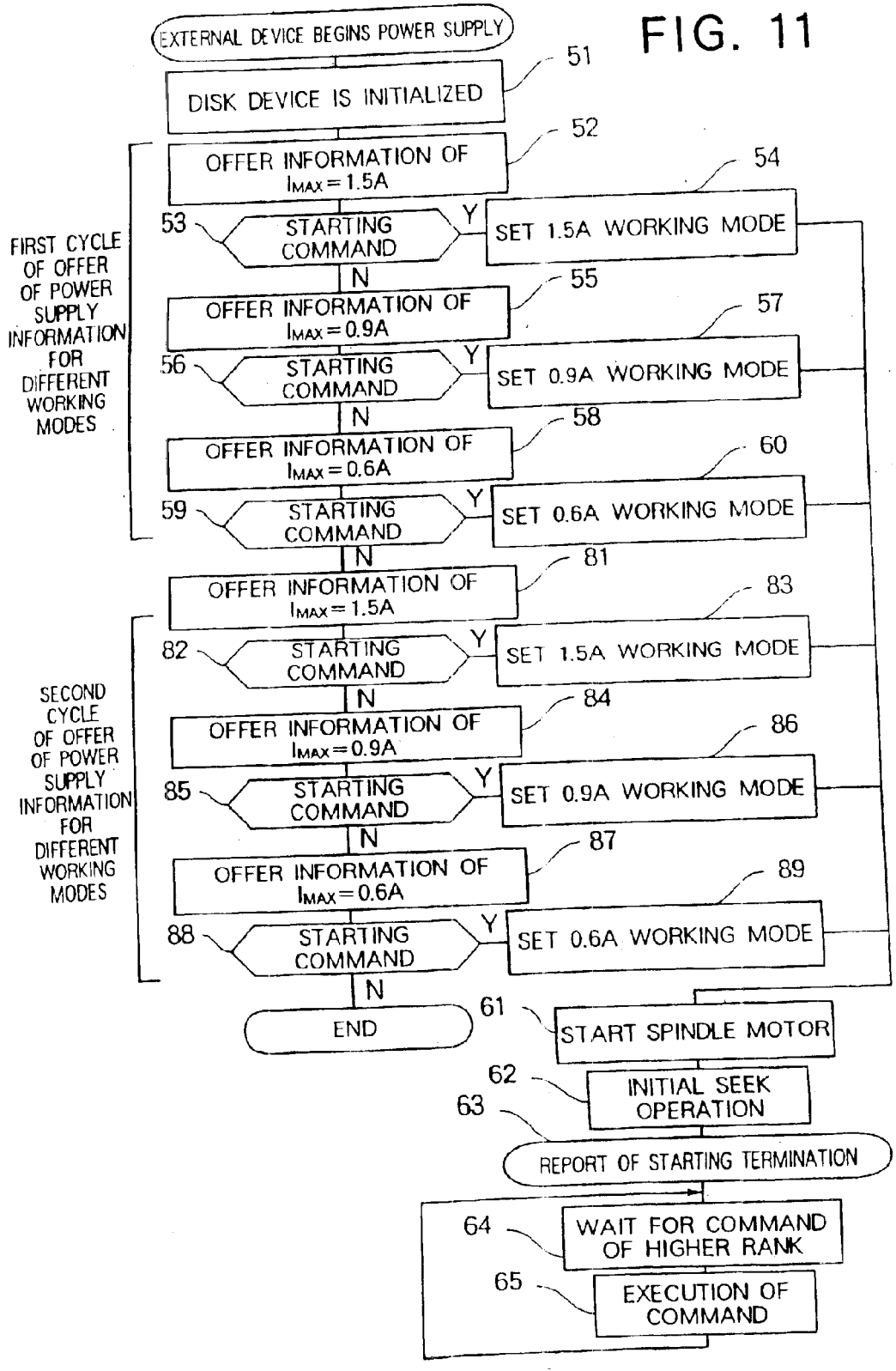
FIG. 11 is a flow chart showing still another embodiment of starting procedure on the disk device side according to the present invention.

FIG. 11 shows a processing flow indicating another embodiment of the starting procedure of the disk device 101.

FIG. 11 corresponds to the case where the predetermined number is set at 2 in Step 66 in FIG. 8. In the embodiment indicated in FIG. 11, the information on a series of necessary maximum currents is transmitted at least twice to the device of higher rank. It is possible also that, on the device of higher rank side, when the information on the series of necessary maximum currents is first received, nothing is selected and it is monitored what current is requested and when it is secondly received, an arbitrary working mode, in which power can be supplied, is selected from the information on the series of necessary maximum currents and sent to the disk device. Steps 81 to 89 are identical to Steps 52 to 60, respectively.

Figure 12:
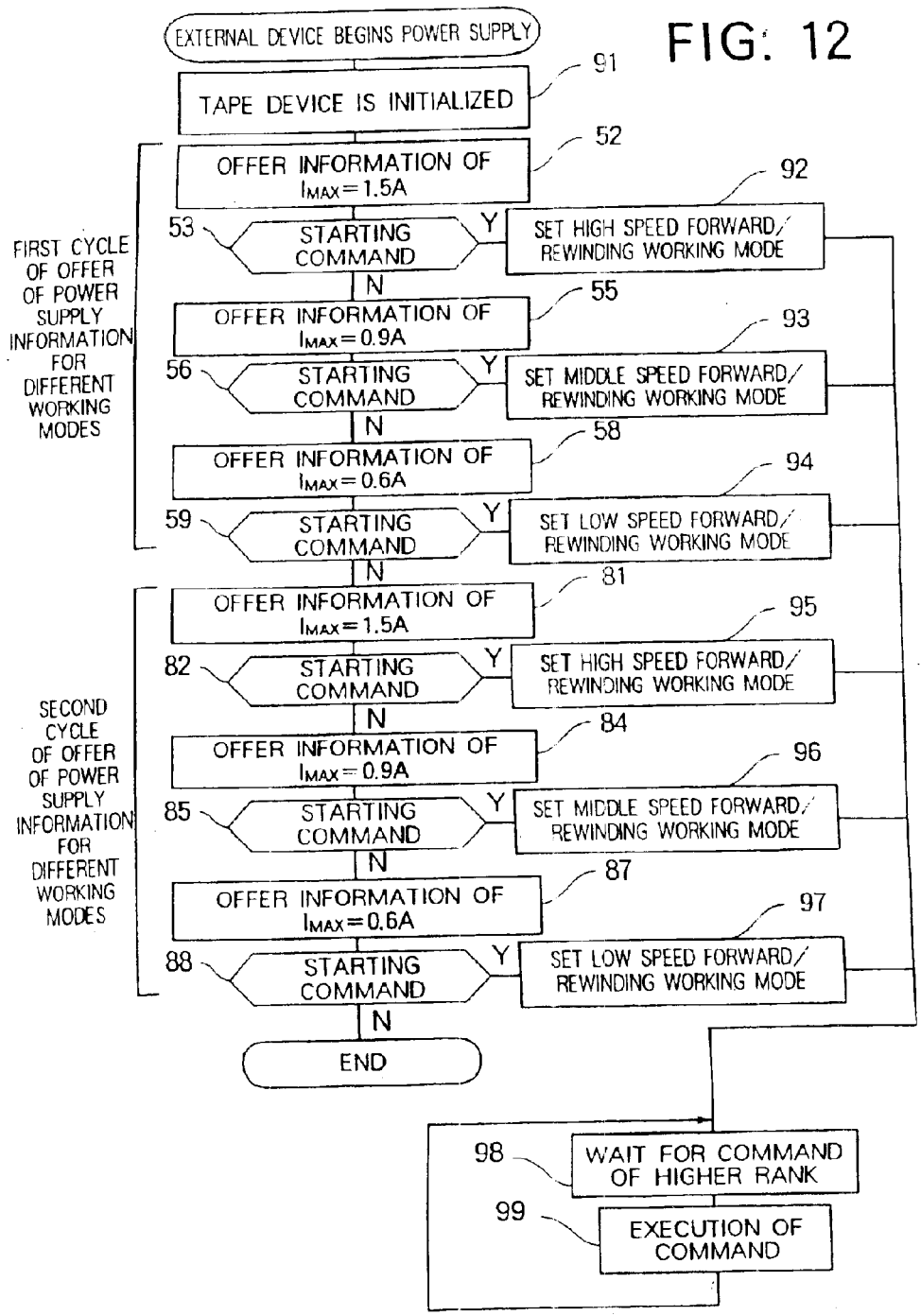
FIG. 12 is a flow chart showing an embodiment of starting procedure on the magnetic tape device side according to the present invention.

FIG. 12 shows a starting procedure of a magnetic tape device. Content of the operation is basically identical to that indicated in FIG. 11. Operation steps having same contents are referred to by same step numbers.

When power is supplied from an external device, which is the device of higher rank, to the tape device, it is initialized (Step 91). Then information on necessary maximum currents is transmitted to the device of higher rank in an order of decreasing currents and the tape device waits for a starting command from the device of higher rank, every time it is transmitted (Steps 52 to 59). When a starting command of 1.5 A working mode is received in Step 53, a high speed forwarding/rewinding working mode is set (Step 92). When a starting command of 0.9 A working mode is received in Step 56, a middle speed forwarding/rewinding working mode is set (Step 93). When a starting command of 0.6 A working mode is received in Step 59, a low speed forwarding/rewinding working mode is set (Step 94). The Steps 94, 95 and 96 in the second current information transmission cycle correspond to the Steps 92, 93 and 94, respectively.

When the working mode is set, the tape device waits for a succeeding command of higher rank (Step 98). When the command is received, fast forwarding/rewinding is effected in the mode thus set and processing of read/write and other commands (Step 99) is executed. Thereafter the procedure returns to Step 98.

If the device of higher rank side responds during the first transmission cycle of the information on the series of currents, the following transmission cycles of the information on currents are not executed, after the corresponding starting command has been received. It is possible also that, on the device of higher rank side, when the information on the series of necessary maximum currents is first received, nothing is selected and it is monitored what current is requested and when it is secondly received, an arbitrary working mode, in which power can be supplied, is selected from the information on the series of necessary maximum currents and sent to the magnetic tape device.

The tape device can be operated at a working mode with a speed as high as possible, every time a command of higher rank is issued, by constructing the procedure so as to return to Step 52 after Step 99 in FIG. 12.

Further there is a command of changing the working mode among other commands processed in Step 99. When the operator commands to issue this command, the procedure returns to Step 52 and thus the working mode can be set again in accordance with power supply conditions of the device of higher rank.

Figure 13:
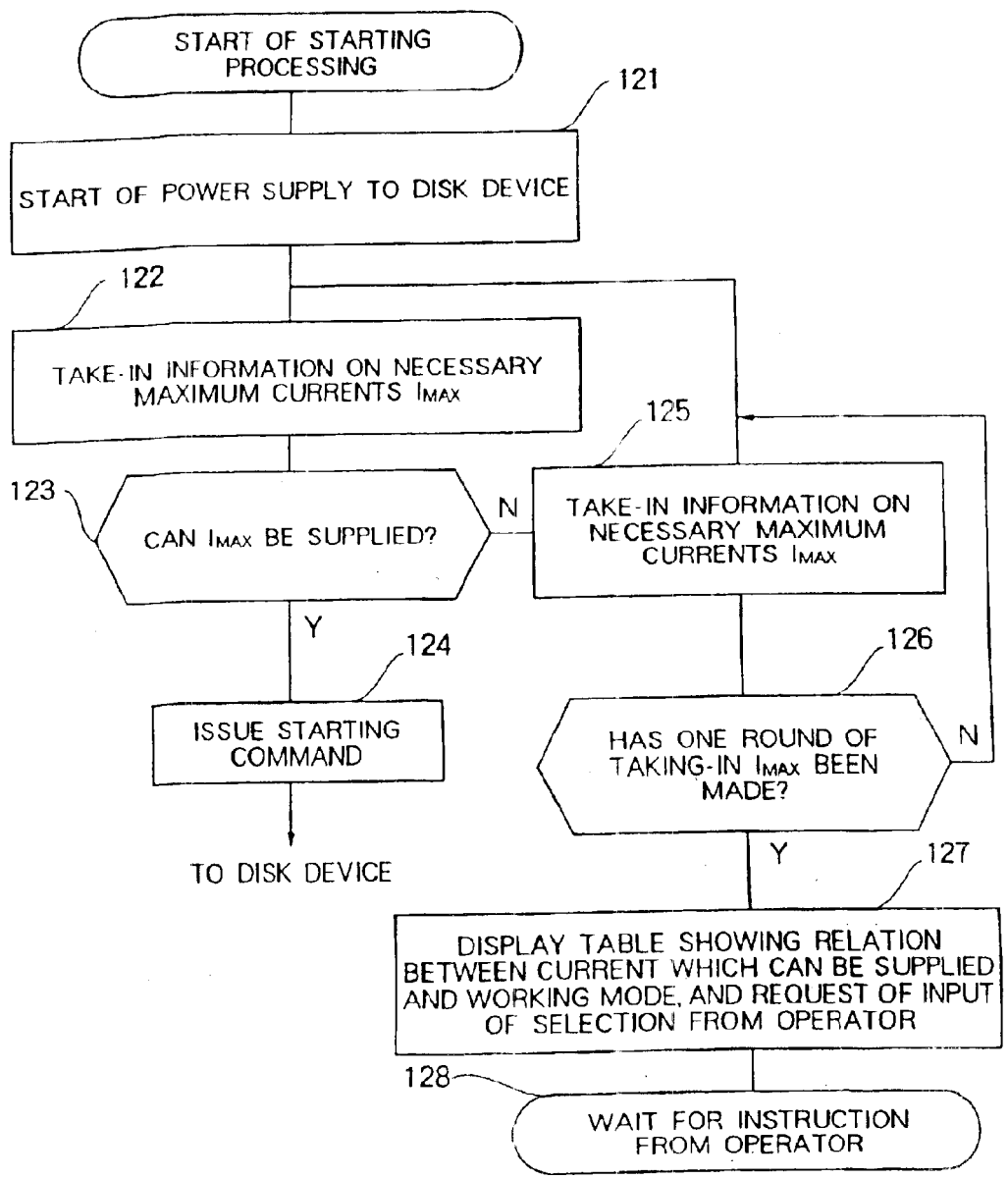
FIG. 13 is a flow chart showing another embodiment of starting procedure of the disk device on the device of higher rank side according to the present invention.

FIG. 13 shows a processing flow indicating an embodiment, in which also the operator can select the working mode.

When the power source is switched on, power is supplied from the power source incorporating information processing device, which is the device of higher rank, to the disk device (Step 121) on the disk device side, when power is supplied, information on a series of necessary maximum currents Imax is offered to the device of higher rank once or by repetition of two times, as indicated in FIG. 8 or FIG. 11. In this case the currents are sent in a decreasing order.

On the device of higher rank side the maximum current information from the disk device is taken-in (Step 122) and it is checked whether the current Imax thus taken-in can be supplied or not (Step 123). When it can be supplied, a start command is issued (Step 124). When current according to the first received current information cannot be supplied, information on a series of currents is taken-in in Steps 125 and 126. A table showing a relation between the current which can be supplied and the working mode, and a request of input of an instruction from the operator to select the working mode is displayed (Step 127), as indicated in FIG. 14. Then the disk device waits for the instruction from the operator (Step 128). The operator sees the display indicated in FIG. 14 and selects a drivable working mode. After it has been judged in Step 123 that the current according to the current information cannot be supplied, the disk device is controlled so as not to accept the second current information and followings in Step 122.

In this way the operator can select a desired working mode to start the disk device, after he has recognized selectable working modes of the disk device.

The disk device may be one of various devices, such as a magnetic disk device, an optical disk device, an opto-magnetic disk device, etc. and the present invention can be applied to any one of them.

Although a disk device is taken as an example if FIGS. 13 and 14, the present invention can be applied also to a magnetic tape device.

Figure 15:
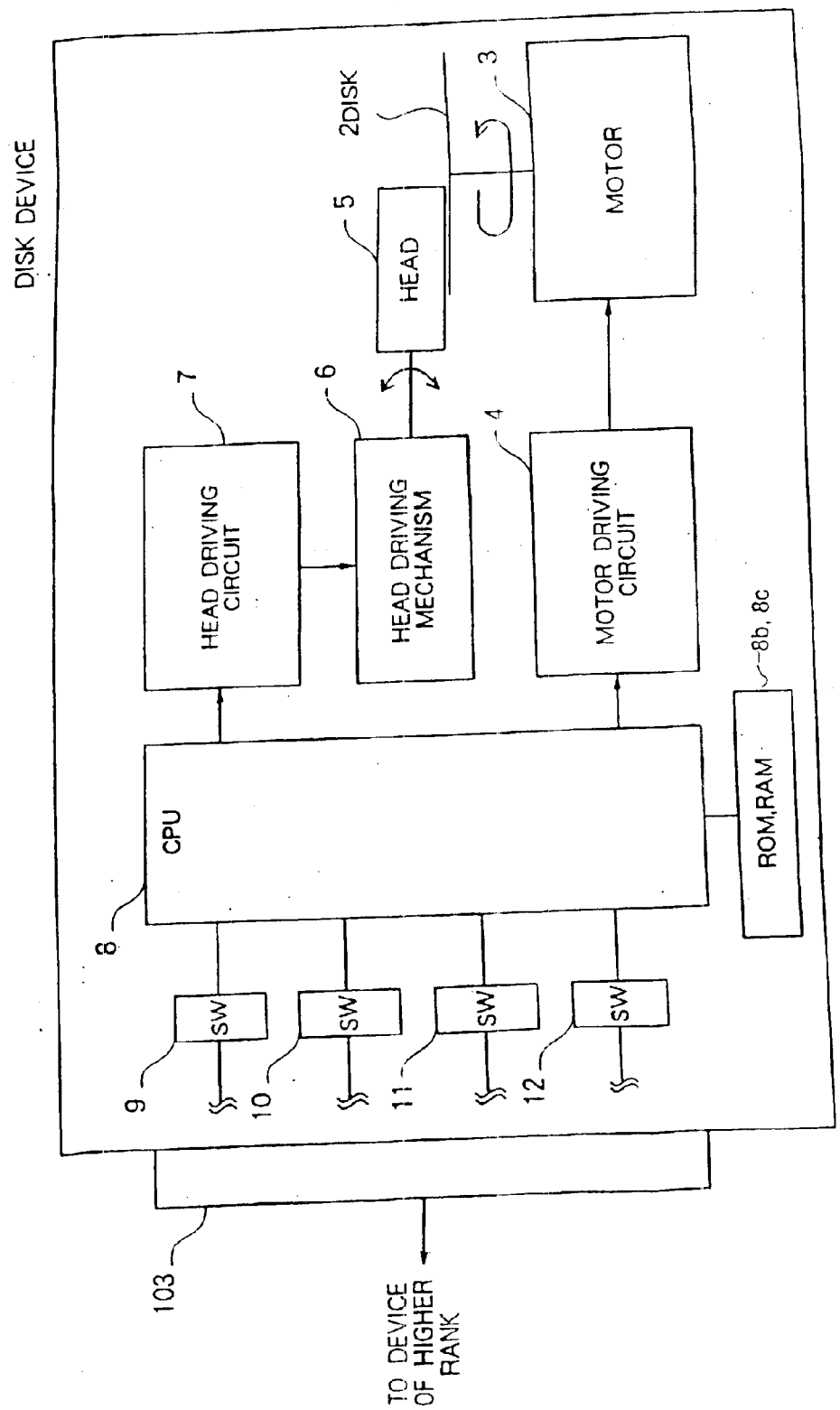
FIG. 15 is a block diagram of a disk device having a working mode turning-over switch according to the present invention.

FIG. 15 shows another embodiment of the disk device according to the present invention, in which the working mode is set by means of a switch.

In FIG. 15, a disk device 1 comprises a magnetic disk 2 acting as recording medium; a motor 3 supporting rotatably the disk 2; a head 5 for reading/writing signals from/in the disk 2; a head driving mechanism 6; a motor driving circuit 4 for driving the motor 3; and a head driving circuit 7 connected with the head driving mechanism 6. Both the driving circuits 4 and 7 are connected with a CPU 8 and ROM 8b and RAM 8c are connected with the CPU 8.

At least one switch 9 to 12 is connected with the CPU 8. In the case indicated in FIG. 15 four switches are connected therewith. Various working modes can be set by combining these switches, as described later.

Two working modes are set within the CPU 8, one of which is a quick mode, in which the motor rotation speed is 7200 rpm and the seek moving time of the head is 8 ms, while the other is a silent mode, in which the motor rotation speed is 5400 rpm (current at starting being same as in quick mode) and the seek moving time of the head is 10 ms (acceleration and deceleration being same as in quick mode). The quick mode is a mode, in which a high speed transfer and a high speed access can be realized in the disk device, while the silent mode is a mode, in which a low power consumption and a low noise can be realized.

The two modes are designed so as to be able to be selected by setting the switches 9 to 12 connected with the CPU 8. For example, when the switch 9 is set at an OFF state, the working mode is the quick mode, while when it is set at an ON state, the disk device is operated in the silent mode. In the case indicated in FIG. 15, since four switches 9 to 12 are connected in FIG. 15, up to 24 different working modes can be set by combining these switches. In the case indicated in FIG. 15, since setting of the working mode is effected by means of the switches 9 to 12, such as e.g. jumper switches, disposed on the disk device, they cannot be set by commands from the device of higher rank (system).

Figure 16:
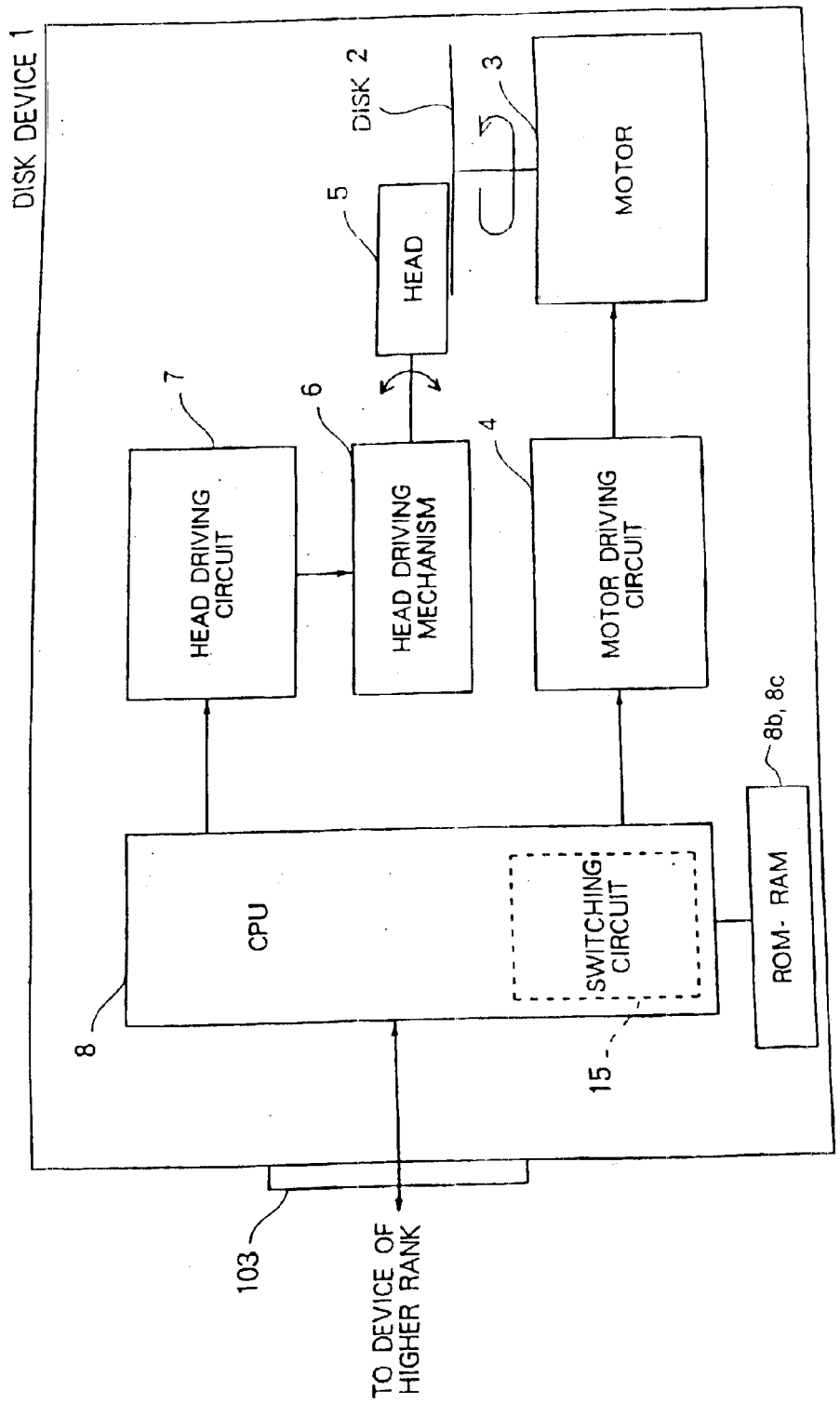
FIG. 16 is a block diagram of another embodiment of the disk device according to the present invention having a working mode switching circuit within CPU.

FIG. 16 shows an outline of the construction of the disk device, which is a second embodiment of the present invention, provided with a driving circuit effecting switching of the working mode by commands from the device of higher rank (system).

In FIG. 16, a disk device 1 comprises a disk 2 acting as recording medium; a motor 3 supporting rotatably the disk 2; a head 5 for reading/writing signals from/in the disk 2; a head driving mechanism 6; a motor driving circuit 4 for driving the motor 3; and a head driving circuit 7 connected with the head driving mechanism 6. Both the driving circuits 4 and 7 are connected with a CPU 8 and ROM 8b and RAM 8c are connected with the CPU 8.

Two working modes, which are a quick mode and a silent mode, are set within the CPU 8 and a switching circuit 15 for switching these two working nodes by commands from the device of higher rank (system) is incorporated. The switching circuit 15 within the CPU 8 is equivalent to the switching circuits 9 to 12 indicated in FIG. 15, but it is constructed by logic circuits so that various working modes are determined by a setting state of input data thereto.

Figure 17:
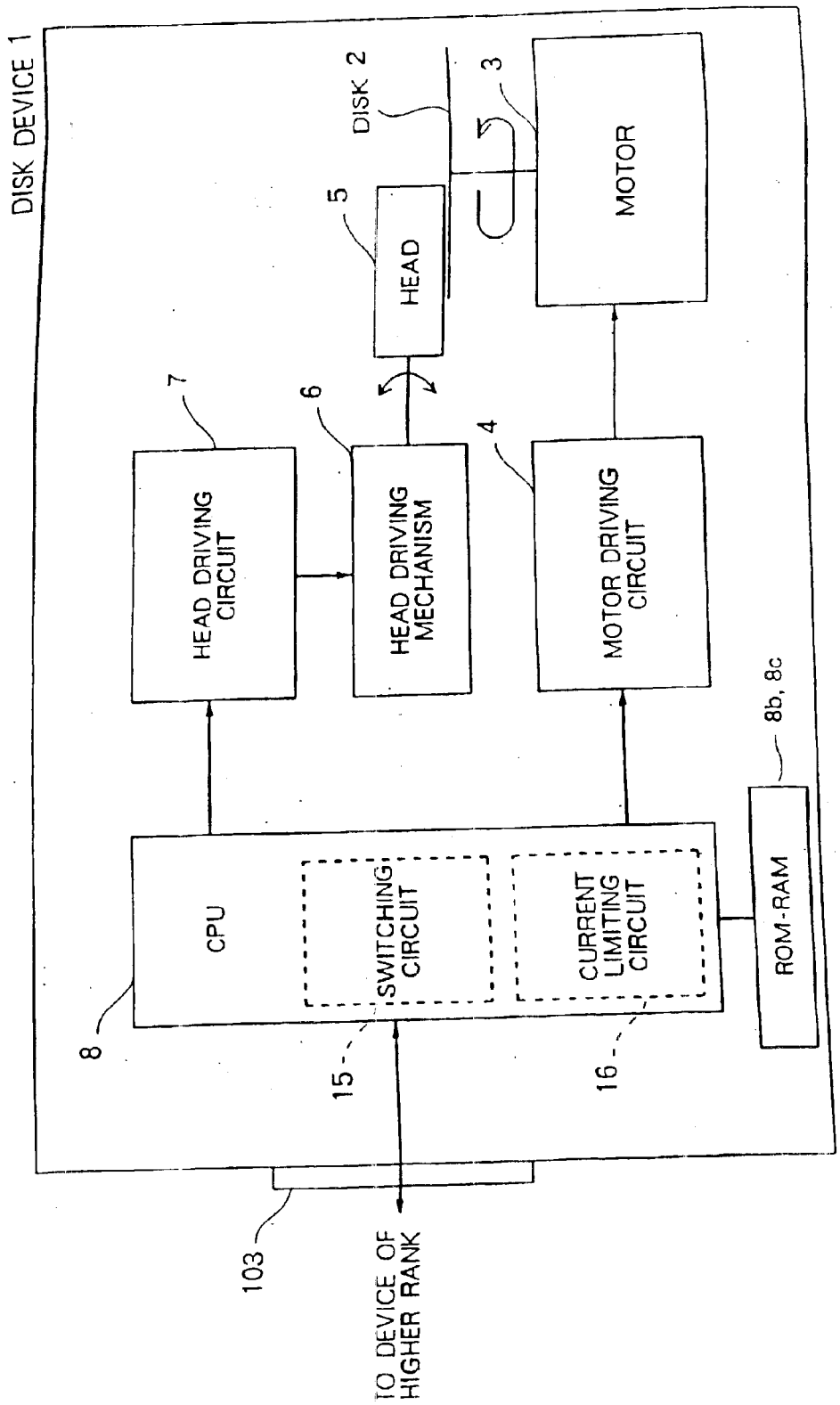
FIG. 17 is a block diagram of still another embodiment of the disk device according to the present invention having a working mode switching circuit within CPU, and a current limiting circuit for each of motor driving circuits.

FIG. 17 shows an outline of the construction of the disk device, which is another embodiment of the present invention, in which a current limiting circuit 16 is incorporated in a CPU 8.

In FIG. 17, a disk device 1 comprises a disk 2 acting as recording medium; a motor 3 supporting rotatably the disk 2; a head 5 for reading/writing signals from/in the disk 2; a head driving mechanism 6; a motor driving circuit 4 for driving the motor 3; and a head driving circuit 7 connected with the head driving mechanism 6. Both the driving circuits 4 and 7 are connected with the CPU 8 and ROM 8b and RAM 8c are connected with the CPU 8.

Two working modes, which are a quick mode and a silent mode, are set within the CPU 8 and further a switching circuit 15 for switching these two working modes by commands from the device of higher rank and a current limiting circuit 16 determining separately maximum currents flowing through the two driving circuit 4 and 7 are incorporated.

The maximum currents determined by the current limiting circuit 16 are linked with the working mode selected by setting the switching circuit 15. For example, in case where the quick mode is selected, the maximum current is not limited, current flowing through the motor driving circuit 4 being 2 A and current flowing through the head driving circuit 7 being 0.9 A (values determined by respective voltage and resistance), while in case where the silent mode is selected, the maximum currents are so selected that current flowing through the motor driving circuit 4 is 1.5 A and current flowing through the head driving circuit 7 is 0.6 A.

Figure 18:
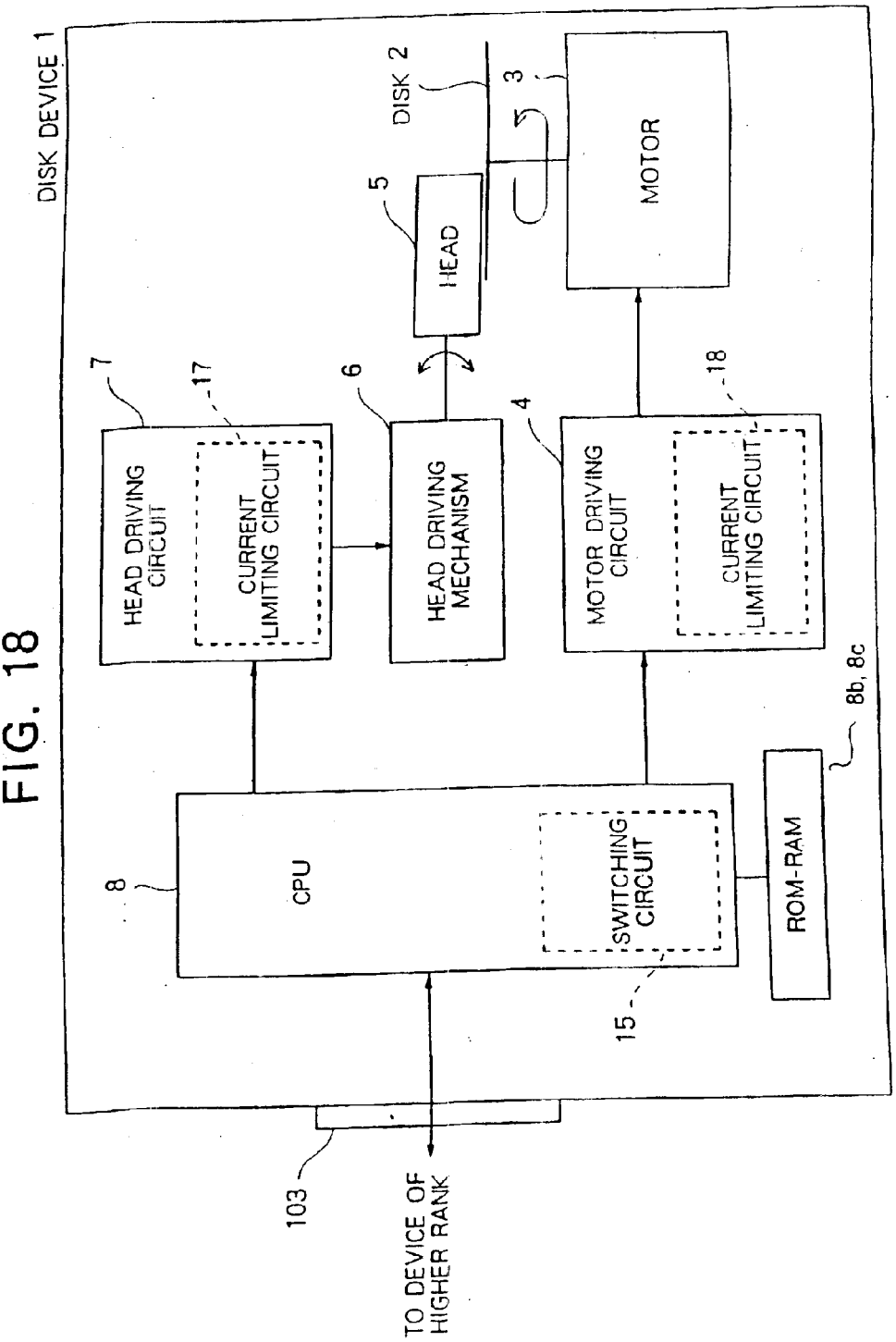
FIG. 18 is a block diagram of still another embodiment of the disk device according to the present invention having a working mode switching circuit within CPU, and a current limiting circuit for each of a head driving circuit and a motor driving circuit.

FIG. 18 shows an outline of the construction of the disk device, which is another embodiment of the present invention, in which current limiting circuits 17 and 18 are incorporated in different driving circuits 4 and 7, respectively.

In FIG. 18, a disk device 1 comprises a disk 2 acting as recording medium; a motor 3 supporting rotatably the disk 2; a head 5 for read/write signals from/in the disk 2; a head driving mechanism 6; a motor driving circuit 4 for driving the motor 3; and a head driving circuit 7 connected with the head driving mechanism 6. Both the driving circuits 4 and 7 are connected with the CPU 8 and ROM 8b and RAM 8c are connected with the CPU 8.

Two working modes, which are a quick mode and a silent mode, are set within the CPU 8 and further a switching circuit 15 for switching these two working modes by commands from the device of higher rank (system) is incorporated.

The maximum currents determined by the current limiting circuits 17 and 18 are linked with the working mode selected by setting the switching circuit 15. For example, in case where the quick mode is selected, the maximum current is not limited. In this case the motor 3 and the head driving mechanism 6 are driven by the driving circuits 4 and 7, respectively, and the maximum currents flowing through the driving circuits 4 and 7 are so set that current flowing through the motor driving circuit 4 is 2 A and current flowing through the head driving circuit 7 is 0.9 A (values determined by respective voltage and resistance), while in case where the silent mode is selected, the maximum currents are so set that the motor 3 and the head driving mechanism 6 are driven by current flowing through the motor driving circuit 4 of 1.5 A and current flowing through the head driving circuit 7 of 0.6 A, respectively. Consequently each of the motor driving circuit and the head driving circuit can be set in two different ways, but content of operation thereof is equivalent to that described for the driving circuit in FIG. 17.

Figure 19A:
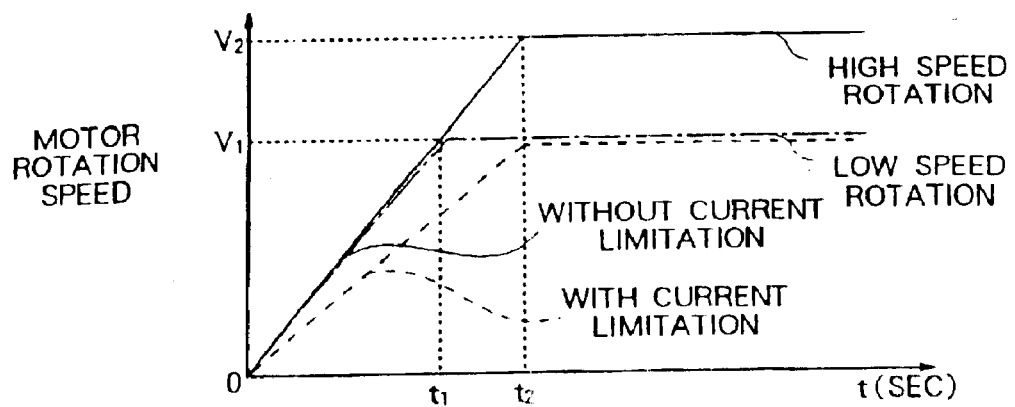
FIG. 19A is a graph indicating variations in rotation speed of a motor at motor start.
Figure 19B:
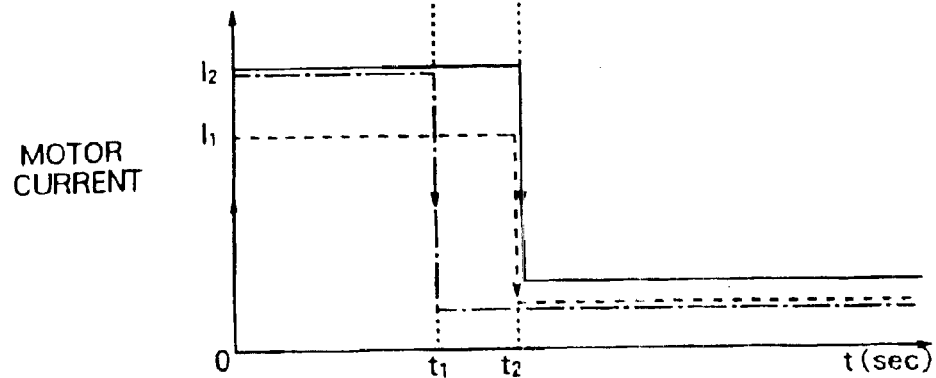
FIG. 19B is a graph indicating variations in current flowing through the motor at motor start.

FIGS. 19A and 19B show variations in the rotation speed (FIG. 19A) and the current (FIG. 19B), respectively, at starting the disk motor (until the rotation speed reaches a stationary state) in the above embodiment.

Solid lines indicate variations in the motor rotation speed v and the current I, respectively, with respect to lapse of time in a quick mode, corresponding to the quick modes in FIGS. 15, 16, 17 and 18. Chain-dotted lines indicate variations in the motor rotation speed and the current, respectively, with respect to lapse of time in a silent mode without current limitation, corresponding to the silent modes in FIGS. 15 and 16. Broken lines indicate variations in the motor rotation speed and the current, respectively, with respect to lapse of time in a silent mode with current limitation, corresponding to the silent modes in FIGS. 17 and 18. Although operations at motor start are indicated in FIGS. 19A and 19B, when the motor is stopped, operation is inversed.

Figure 20A:
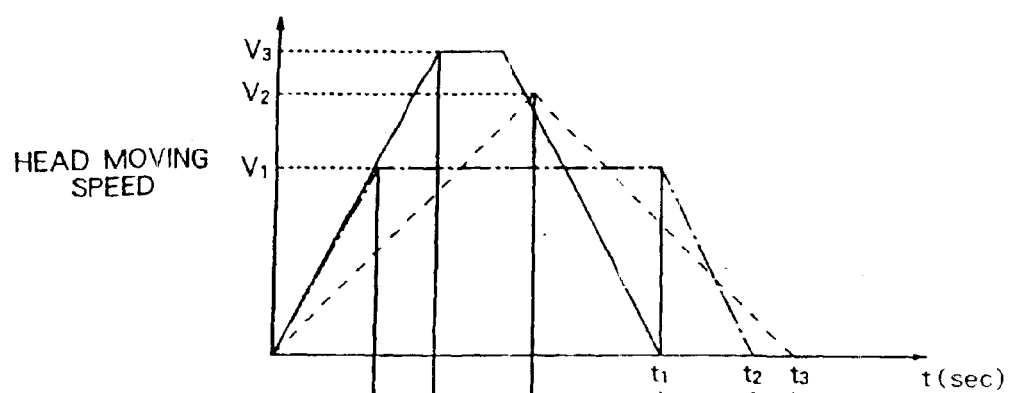
FIG. 20A is a graph indicating variations in head moving speed at motor start and stop.
Figure 20B:
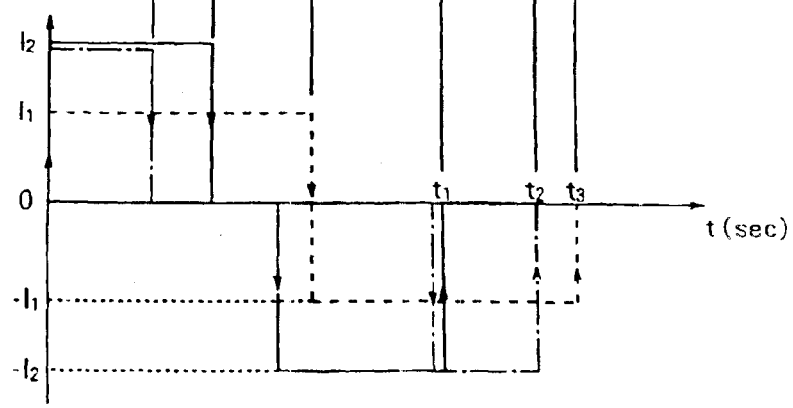
FIG. 20B is a graph indicating variations in current flowing through a head driving circuit at motor start.

FIGS. 20A and 20B show variations in the moving speed of the head (FIG. 20A) and the current flowing through the head driving circuit (FIG. 20B) at moving the head in the above embodiments.

Solid lines indicate variations in the head moving speed v and the current I, respectively, with respect to lapse of time in a quick mode, corresponding to the quick modes in FIGS. 15, 16, 17 and 18. Chain-dotted lines indicate variations in the head moving speed and the current, respectively, with respect to lapse of time in a silent mode, acceleration and deceleration being same as those in the quick mode and maximum speed being limited at v1, corresponding to the silent modes in FIGS. 15 and 16. Broken lines indicate variations in the moving speed and the current, respectively, with respect to lapse of time in a silent mode, the maximum speed being not limited and the current at acceleration and deceleration being limited at I1 and -I1, respectively, corresponding to the silent modes in FIGS. 17 and 18. Minus current is made flow for braking and in the high speed access mode a current as high as that at starting is made flow at stopping.

Beside them another silent mode is conceivable, in which both the maximum speed and the current at acceleration/deceleration are limited.

Further, although it is supposed in the above embodiment that there are two kinds of working modes, quick mode and silent mode, the system can be so constructed that three kinds of modes, which are a normal (standard) mode, a quick mode, in which higher speed access is possible than in the normal mode, and a silent mode, in which lower speed and lower power consumption are possible than in the normal mode, or more than three kinds of modes are selected by switching.

In the above embodiments, since the speed of the disk motor is constant, unless mode change is effected in the course, once the system is started in a certain mode, operation of increasing the rotation speed of the motor up to a predetermined value for every access is unnecessary and therefore no delay in the read/write operation attendant on the increasing the rotation speed of the motor up to the predetermined value is produced.

Figure 21:
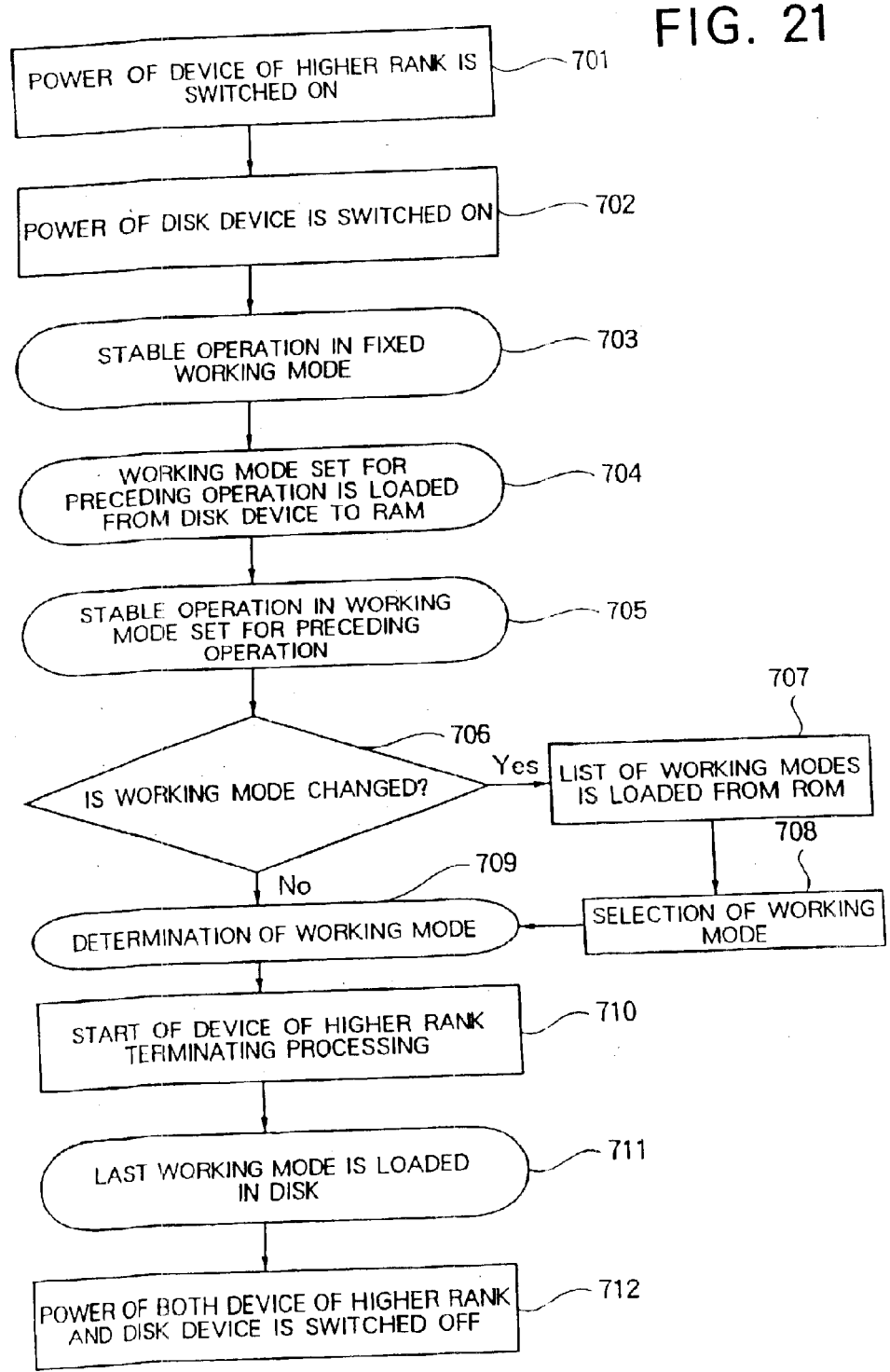
FIG. 21 a flow chart for explaining a working relation between the disk device and the device of higher rank according to the present invention.

FIG. 21 is a flow chart for explaining working relation between the disk device and the device of higher rank according to the present invention.

At first the power source in the main body of the device of higher rank provided with the disk device is switched on (701) and the power source of the power source of the disk device is switched on (702).

Directly after switch-on of the power sources the working mode is set by using information stored in ROM and a stable state is established (703). Directly thereafter, information of the working mode at the termination of the last operation stored on the surface of the disk is loaded to store the information in the RAM (704). A stable working mode is established in the working mode based on the information stored in the RAM (705). At this time the normal mode setting intermediate property between the quick mode and the silent mode is set previously in the ROM.

In case where the working mode of the disk device is changed (706), at first a list of the working modes stored in the ROM of the disk device is loaded from the device of higher rank (707). The loaded list of the working modes is displayed on the display of the device of higher rank in such a manner that the working mode set for the preceding operation is specifically stressed, and the user selects one working mode (708). Together therewith, the information of the working mode stored in the RAM is replaced by information of the working mode selected by the user and in this way the working mode is established (709).

In case where the working mode is changed by the user as described above, it is waited that a stable working state is again established.

Thereafter file access from the device of higher rank to the disk device is started in the working mode thus set to effect required data transfer.

Further, when termination processing of the device of higher rank begins (710), information on the last working mode stored in the RAM of the disk device is recorded in a specified place on the surface of the disk (711), which is "the working mode of the preceding operation" used next time at restarting the device of higher mode.

When all the processings have been terminated, the power sources of the device of higher rank and the disk device are switched off (712).

Next, as still another embodiment of the present invention, an example will be explained, in which the disk device indicated in FIG. 16, 17 or 18 is applied to a computer using both a commercial AC power source and an incorporated battery power source, e.g. a notebook type personal computer.

In general, concerning power supply form for a notebook type personal computer, when it is used as a portable computer, it utilizes an incorporated battery and when it is used in an office, etc., it utilizes commercial 100 V AC. In case where it utilizes the incorporated battery as a portable computer, power consumption of the system has direct influences on continuous utilization time. Since it can be said that longer continuous utilization time is more desirable, it can be said that a disk device having a smaller power consumption has a better performance. On the other hand, when 100 V AC is utilized as power source, since it is not necessary to pay special attention on power consumption, in so far as power supply is not stopped, it can be said that a disk device, by which read/write of information is effected with a higher speed, has a better performance. Therefore, for a notebook type personal computer, it can be said that a disk device having a small power consumption when it is used as a portable computer, for which a high speed file access is possible if necessary, is convenient to use.

However, heretofore, there were only disk devices having either one of the properties or an intermediate property which is neither of them. This is because it is difficult technically to achieve a small power consumption and a high speed access at the same time.

Therefore, in the present embodiment, a disk device provided with a plurality of working modes described in the above different embodiments is applied to notebook type personal computer so that the quick mode of a high speed access is selected automatically when a commercial AC power source is used as power supply of the personal computer and the attached disk device while the silent mode of a low power consumption is selected automatically when an incorporated battery power source is used.

That is, there is disposed at first a detecting portion 37 for measuring voltage of an external power source as shown in FIG. 5 in an electric power receiving portion of the device of higher rank as a mechanism for sensing whether power is supplied from the external power source. Usually, in a notebook type personal computer, there is disposed a diode for preventing reverse current from the battery to the commercial power source and when the external commercial power supply is stopped, power supply is automatically switched over to the incorporated battery. Thus, in case where it is sensed by the sensing mechanism that no power is supplied from the external power source, i.e. the device of higher rank is driven by the incorporated battery, a signal thus obtained is monitored by the CPU in the device of higher rank, the CPU in the device of higher rank gives automatically the disk device a command to work with the working mode (silent mode) aiming a low power consumption. On the contrary, in case where the sensing mechanism has sensed that power is supplied from the external power source, the CPU in the device of higher rank gives automatically the disk device a command to work with the working mode (quick mode) aiming a high speed file access. In this way, the relation between the utilization form of the notebook type personal computer and the working mode of the disk device is such that the working mode of low power consumption is set automatically, when it is used as a portable computer, while the working mode of high speed file access is set automatically, when it is used in a office.

However, when the operator wishes to change the working mode, he can set freely at any time a desired working mode by inputting a working mode changing command e.g. by means of a keyboard.

As a magnetic disk device for realizing the present invention, a device using a magnetic head having a negative pressure slider structure can be utilized. This magnetic head is in contact with the surface of the disk, when the magnetic disk remains immobile, but it keeps a constant floating amount independently from the number of turns (in either working mode), when the rotation speed of the disk is higher than a predetermined value.

Although, in the above embodiments, explanation has been made, using a magnetic disk device, the present invention can be applied as well to an optical disk device and an opto-magnetic disk device.

Further the present invention is not restricted to those described in the embodiments, but it includes various modifications in the scope defined in the claims.

What is claimed is:

1. An operating method for a disk drive coupled to a higher rank device, the disk drive having
   a disk-shaped memory medium,
   a motor rotatably supporting the medium,
   a motor driving circuit to drive the motor,
   a read or write head,
   a head driving mechanism to drive the head,
   a head driving circuit coupled to the head driving mechanism, and
   a microprocessor coupled to both the head driving circuit and the motor driving circuit, comprising:
   switching on a power source of the disk drive;
   establishing a last seek mode before switching on; and
   selecting one of a plurality of seek modes according to a command from the higher rank device, wherein if a first seek mode is selected, then the head driving circuit supplies a first drive current to the head driving mechanism, if a second seek mode is selected, then the head driving circuit supplies a second drive current to the head driving mechanism; and
   wherein a noise level of the disk drive when the first seek mode is selected is greater than a noise level of the disk drive when the second seek mode is selected.

2. The method as defined in claim 1, further comprising:
   selecting another of a plurality of seek modes according to a command from the higher rank device.

3. The method as defined in claim 1, wherein
   the switching on step occurs when mounting the disk drive to the higher rank device.

4. An information storing device, to be coupled to a higher rank device, comprising:
   a disk-shaped memory medium;
   a spindle motor;
   a motor driving circuit to drive the spindle motor;
   a read or write head;
   a head driving mechanism to drive the head; and
   a head driving circuit coupled to said head driving mechanism,
   wherein when the information storing device is powered in response to the higher rank device, a last seek mode among a plurality of seek modes is activated in the information storing device,
   wherein said plurality of seek modes includes a first seek mode and a second seek mode,
   if said first seek mode is selected, then the head driving circuit supplies a first drive current to the head driving mechanism,
   if said second seek mode is selected, then the head driving circuit supplies a second drive current to the head driving mechanism, and
   a noise level of the information storing device when the first seek mode is selected is greater than a noise level of the information storing device when the second seek mode is selected.

5. The information storing device as defined in claim 4, further comprising a connector for receiving the command from the higher rank device.

6. The information storing device is defined in claim 4, wherein the first seek mode is a quick mode effecting short time seeking and the second seek mode is a silent mode effecting low noise seeking.

7. The information storing device as defined in claim 4, further comprising a current limiter to limit currents flowing through the head driving circuit in order to set different voltages according to the selected mode.

8. A magnetic disk device, to be coupled to a higher rank device, comprising:

a disk shaped memory medium;

a spindle motor;

a first driving circuit to drive said spindle motor;

a magnetic head;

a voice coil motor to drive said magnetic head; and a second driving circuit to drive said voice coil motor, wherein said magnetic disk device has a first mode and a second mode, which is selected by a command received from said higher rank device, wherein a noise level of said first mode is greater than a noise level of aid second mode, wherein when said first mode is selected said second driving circuit supplies a first driving current to said voice coil motor for seek operation, wherein when said second mode is selected said second driving circuits supplies a second driving current to said voice coil motor for seek operation, wherein a maximum value of said first driving current is larger than a maximum value of said second driving current, wherein the information of the mode selected before shutting off the magnetic disk device is stored inside said magnetic disk device.

9. The magnetic disk device according to claim 1, further comprising:

a RAM; and a CPU, wherein said information is stored on the surface of said disk shaped memory medium.

* * * * *

UNITED STATES PATENT AND TRADEMARK OFFICE
CERTIFICATE OF CORRECTION

PATENT NO. : 6,865,048 B2 Page 1 of 1
APPLICATION NO. : 10/406007
DATED : March 8, 2005
INVENTOR(S) : Yuichi Koizumi et al.

It is certified that error appears in the above-identified patent and that said Letters Patent is hereby corrected as shown below:

| Column | Line | |
|---|---|---|
| 4 | 46 | Change "tio" to --to--. |
| 8 | 19 | Change "lenghten" to --lengthen--. |
| 21 | 22 | Change "aid second mode," to --said second mode,--. |

Signed and Sealed this

Eighth Day of January, 2008

JON W. DUDAS
*Director of the United States Patent and Trademark Office*